(12) United States Patent
Engelbrecht et al.

(10) Patent No.: US 12,037,497 B2
(45) Date of Patent: Jul. 16, 2024

(54) ANTI-ADHERENT COMPOSITION AGAINST DNA VIRUSES AND METHOD OF INHIBITING THE ADHERENCE OF DNA VIRUSES TO A SURFACE

(71) Applicant: KIMBERLY-CLARK WORLDWIDE, INC., Neenah, WI (US)

(72) Inventors: Kathleen C. Engelbrecht, Kaukauna, WI (US); Stacy A. Mundschau, Weyauwega, WI (US); David W. Koenig, Menasha, WI (US); Scott W. Wenzel, Neenah, WI (US)

( * ) Notice: Subject to any disclaimer, the term of this patent is extended or adjusted under 35 U.S.C. 154(b) by 945 days.

(21) Appl. No.: 16/071,328

(22) PCT Filed: Jan. 28, 2016

(86) PCT No.: PCT/US2016/015292
§ 371 (c)(1),
(2) Date: Jul. 19, 2018

(87) PCT Pub. No.: WO2017/131691
PCT Pub. Date: Aug. 3, 2017

(65) Prior Publication Data
US 2021/0189167 A1  Jun. 24, 2021

(51) Int. Cl.
| | | |
|---|---|---|
| C09D 101/28 | (2006.01) | |
| A47L 13/17 | (2006.01) | |
| B08B 17/02 | (2006.01) | |
| C09D 5/00 | (2006.01) | |
| C09D 7/63 | (2018.01) | |
| C11D 3/22 | (2006.01) | |
| C11D 17/04 | (2006.01) | |

(52) U.S. Cl.
CPC .......... *C09D 101/284* (2013.01); *A47L 13/17* (2013.01); *B08B 17/02* (2013.01); *C09D 5/00* (2013.01); *C09D 7/63* (2018.01); *C11D 3/225* (2013.01); *C11D 17/049* (2013.01)

(58) Field of Classification Search
CPC ........ C09D 101/284; C09D 5/00; C09D 7/63; B09B 17/02; C11D 3/225; C11D 17/049; A47L 13/17
See application file for complete search history.

(56) References Cited

U.S. PATENT DOCUMENTS

| | | |
|---|---|---|
| 1,680,584 A | 8/1928 | Angell |
| 3,241,898 A | 3/1966 | Propst |
| 3,303,048 A | 2/1967 | Cooper et al. |
| 3,338,992 A | 8/1967 | Kinney |
| 3,341,394 A | 9/1967 | Kinney |
| 3,494,821 A | 2/1970 | Franklin |
| 3,502,538 A | 3/1970 | Claine |
| 3,502,763 A | 3/1970 | Hartmann |
| 3,542,615 A | 11/1970 | Dobo |
| 3,692,618 A | 9/1972 | Carduck |
| 3,802,817 A | 4/1974 | Goto |
| 3,849,241 A | 11/1974 | Butin |
| 3,954,962 A | 5/1976 | Prussin |
| 4,007,113 A | 2/1977 | Ostreicher |
| 4,100,324 A | 7/1978 | Anderson |
| 4,144,370 A | 3/1979 | Boulton |
| 4,340,563 A | 7/1982 | Appel |
| 4,361,486 A | 11/1982 | Hou |
| 4,624,890 A | 11/1986 | Lloyd |
| 4,795,668 A | 1/1989 | Krueger |
| 5,057,361 A | 10/1991 | Sayovitz |
| 5,057,368 A | 10/1991 | Largman |
| 5,069,970 A | 12/1991 | Largman |
| 5,108,820 A | 4/1992 | Kaneko |
| 5,162,074 A | 11/1992 | Hills |
| 5,277,976 A | 1/1994 | Hogle |
| 5,284,703 A | 2/1994 | Everhart |
| 5,336,552 A | 8/1994 | Strack |
| 5,350,624 A | 9/1994 | Georger |
| 5,382,400 A | 1/1995 | Pike |
| 5,413,789 A | 5/1995 | Hagiwara et al. |
| 5,466,410 A | 11/1995 | Hills |

(Continued)

FOREIGN PATENT DOCUMENTS

| | | |
|---|---|---|
| AU | 2010226857 B2 | 7/2016 |
| AU | 2015297023 B2 | 11/2019 |

(Continued)

OTHER PUBLICATIONS

Kohli R. Microbial Cleaning for Removal of Surface Contamination. Developments in Surface Contamination and Cleaning. 2013; 139-161. (Year: 2013).*
Pitusiak, ip.com, Skin Care Formulation with Structure(R) Cell Thickeners, 2011, pp. 1-6. (Year: 2011).*
Nalawade et al., Bactericidal activity of propylene glycol, glycerine, polyethylene glycol 400, and polyethylene glycol 1000 against selected microorganisms. J Int Soc Prev Community Dent. Mar.-Apr. 2015;5(2):114-9. (Year: 2015).*
Romanò CL, De Vecchi E, Bortolin M, Morelli I, Drago L. Hyaluronic Acid and Its Composites as a Local Antimicrobial/Antiadhesive Barrier. J Bone Jt Infect. Jan. 1, 2017;2(1):63-72. (Year: 2017).*

(Continued)

*Primary Examiner* — Abigail Vanhorn
(74) *Attorney, Agent, or Firm* — KIMBERLY-CLARK WORLDWIDE, INC.

(57) ABSTRACT

A composition for inhibiting the attachment of DNA viruses to a surface can include a liquid carrier, an anti-adherent agent, and a humectant. The anti-adherent agent can include C12-16 Alkyl PEG-2 Hydroxypropyl Hydroxyethyl Ethylcellulose. A method for inhibiting the adherence of DNA viruses to a surface can include providing a composition that includes an anti-adherent agent including C12-16 Alkyl PEG-2 Hydroxypropyl Hydroxyethyl Ethylcellulose. The method can also include applying the composition to the surface to inhibit the adherence of DNA viruses to the surface.

3 Claims, No Drawings

(56) References Cited

U.S. PATENT DOCUMENTS

| | | |
|---|---|---|
| 5,512,186 A | 4/1996 | Wright |
| 5,593,599 A | 1/1997 | Wright |
| 5,736,058 A | 4/1998 | Wright |
| 5,742,943 A | 4/1998 | Chen |
| 5,762,948 A | 6/1998 | Blackburn et al. |
| 5,785,179 A | 7/1998 | Buczwinski |
| 5,855,788 A | 1/1999 | Everhart |
| 5,908,707 A | 6/1999 | Cabell |
| 5,935,883 A | 8/1999 | Pike |
| 5,942,219 A | 8/1999 | Hendriks |
| 5,951,965 A | 9/1999 | Ansari |
| 5,964,351 A | 10/1999 | Zander |
| 5,989,004 A | 11/1999 | Cook |
| 5,989,527 A | 11/1999 | Siegfried et al. |
| 6,030,331 A | 2/2000 | Zander |
| 6,110,381 A | 8/2000 | Wright |
| 6,123,996 A | 9/2000 | Larsson |
| 6,158,614 A | 12/2000 | Haines |
| 6,180,584 B1 | 1/2001 | Sawan |
| 6,200,669 B1 | 3/2001 | Marmon |
| 6,228,385 B1 | 5/2001 | Shick |
| 6,231,719 B1 | 5/2001 | Garvey |
| 6,241,898 B1 | 6/2001 | Wright |
| 6,248,880 B1 | 6/2001 | Karlson |
| 6,267,996 B1 | 7/2001 | Bombardelli |
| 6,269,969 B1 | 8/2001 | Huang |
| 6,269,970 B1 | 8/2001 | Huang |
| 6,273,359 B1 | 8/2001 | Newman |
| 6,274,041 B1 | 8/2001 | Williamson |
| 6,294,186 B1 | 9/2001 | Beerse |
| 6,306,514 B1 | 10/2001 | Weikel |
| 6,315,864 B2 | 11/2001 | Anderson |
| 6,340,663 B1 | 1/2002 | Deleo |
| 6,515,095 B1 | 2/2003 | Omura |
| 6,565,749 B1 | 5/2003 | Hou |
| 6,569,828 B1 | 5/2003 | Thomas |
| 6,630,016 B2 | 10/2003 | Koslow |
| 6,639,066 B2 | 10/2003 | Boström |
| 6,696,070 B2 | 2/2004 | Dunn |
| 6,770,204 B1 | 8/2004 | Koslow |
| 6,800,354 B2 | 10/2004 | Baumann et al. |
| 6,838,005 B2 | 1/2005 | Tepper |
| 6,916,480 B2 | 7/2005 | Anderson |
| 6,946,196 B2 | 9/2005 | Foss |
| 7,071,152 B2 * | 7/2006 | McDonnell ............ A01N 59/00 510/161 |
| 7,169,304 B2 | 1/2007 | Hughes |
| 7,192,601 B2 | 3/2007 | Walker |
| 7,287,650 B2 | 10/2007 | Koslow |
| 7,288,513 B2 | 10/2007 | Taylor |
| 7,384,762 B2 | 6/2008 | Drocourt |
| 7,432,234 B2 | 10/2008 | Ochomogo |
| 7,569,530 B1 | 8/2009 | Pan |
| 7,576,256 B2 | 8/2009 | Björnberg |
| 7,625,844 B1 | 12/2009 | Yang |
| 7,642,395 B2 | 1/2010 | Schroeder |
| 7,795,199 B2 | 9/2010 | Molinaro |
| 7,872,051 B2 | 1/2011 | Clarke |
| 7,985,209 B2 | 7/2011 | Villanueva |
| 7,993,675 B2 | 8/2011 | Oliver |
| 8,030,226 B2 | 10/2011 | Bradley |
| 8,034,844 B2 | 10/2011 | Fox |
| 8,293,699 B2 | 10/2012 | Fütterer |
| 8,318,654 B2 | 11/2012 | Hoffman |
| 8,343,523 B2 | 1/2013 | Toreki |
| 8,481,480 B1 | 7/2013 | Lam |
| 8,506,978 B2 | 8/2013 | Soerens |
| 8,530,524 B2 | 9/2013 | Wegner |
| 8,551,518 B2 | 10/2013 | Marsh et al. |
| 8,603,771 B2 | 12/2013 | Stanley |
| 8,685,178 B2 | 4/2014 | Do |
| 8,771,661 B2 | 7/2014 | MacDonald |
| 8,871,722 B2 | 10/2014 | Harding |
| 8,877,882 B1 | 11/2014 | Salamone et al. |
| 9,006,163 B2 | 4/2015 | Hourigan |
| 9,034,346 B2 | 5/2015 | Miller et al. |
| 9,119,779 B2 | 9/2015 | Marsh et al. |
| 9,226,517 B2 | 1/2016 | Pumarola Segura et al. |
| 9,254,255 B2 | 2/2016 | Chang et al. |
| 9,326,924 B1 | 5/2016 | Fourre et al. |
| 9,511,206 B2 | 12/2016 | Hofius et al. |
| 9,555,141 B2 | 1/2017 | Samadpour |
| 9,675,717 B2 | 6/2017 | Kim et al. |
| 9,969,885 B2 | 5/2018 | Engelbrecht |
| 10,028,899 B2 | 7/2018 | Chaudhary |
| 10,485,742 B2 | 11/2019 | Patel et al. |
| 10,792,236 B2 | 10/2020 | Pan et al. |
| 10,813,948 B2 | 10/2020 | Abbott et al. |
| 10,960,012 B2 | 3/2021 | Baker et al. |
| 2001/0037100 A1 | 11/2001 | Shanklin |
| 2001/0040136 A1 | 11/2001 | Wei |
| 2001/0046525 A1 | 11/2001 | Bombardelli |
| 2002/0050016 A1 | 5/2002 | Willman |
| 2002/0189998 A1 | 12/2002 | Haase |
| 2003/0008791 A1 | 1/2003 | Chiang |
| 2003/0044446 A1 | 3/2003 | Moro et al. |
| 2003/0069317 A1 | 4/2003 | Seitz |
| 2003/0091540 A1 | 5/2003 | Ahmad |
| 2003/0162684 A1 | 8/2003 | Huyhn et al. |
| 2004/0009141 A1 | 1/2004 | Koenig |
| 2004/0024374 A1 | 2/2004 | Hjorth |
| 2005/0118237 A1 | 6/2005 | Krzysik et al. |
| 2005/0130870 A1 | 6/2005 | Ochomogo |
| 2005/0137540 A1 | 6/2005 | Villanueva |
| 2005/0182021 A1 | 8/2005 | Nichols |
| 2005/0242041 A1 | 11/2005 | Cumberland |
| 2005/0244480 A1 | 11/2005 | Koenig |
| 2005/0271595 A1 | 12/2005 | Brown |
| 2006/0008621 A1 | 1/2006 | Gusky |
| 2006/0134239 A1 | 6/2006 | Weide |
| 2006/0140899 A1 | 6/2006 | Koenig |
| 2006/0193789 A1 | 8/2006 | Tamarkin |
| 2006/0204466 A1 | 9/2006 | Littau |
| 2006/0205619 A1 | 9/2006 | Mayhall |
| 2006/0292086 A1 | 12/2006 | Curtis |
| 2007/0020649 A1 | 1/2007 | Tseng |
| 2007/0048344 A1 | 3/2007 | Yahiaoui et al. |
| 2007/0141934 A1 | 6/2007 | Sayre |
| 2007/0207104 A1 | 9/2007 | Borish |
| 2007/0237800 A1 | 10/2007 | Lahann |
| 2007/0253926 A1 | 11/2007 | Tadrowski |
| 2007/0286894 A1 | 12/2007 | Marsh |
| 2008/0102053 A1 | 5/2008 | Childers |
| 2008/0275113 A1 | 11/2008 | Huetter |
| 2008/0293613 A1 | 11/2008 | Johnson |
| 2008/0293826 A1 | 11/2008 | Rose |
| 2008/0312118 A1 | 12/2008 | Futterer |
| 2009/0004122 A1 | 1/2009 | Modak |
| 2009/0082472 A1 | 3/2009 | Peters |
| 2009/0087465 A1 | 4/2009 | Doney |
| 2009/0155325 A1 | 6/2009 | Wenzel |
| 2009/0155327 A1 | 6/2009 | Martin |
| 2009/0191248 A1 | 7/2009 | Hoffman |
| 2009/0226498 A1 | 9/2009 | Flugge-Berendes |
| 2010/0135916 A1 | 6/2010 | Courel |
| 2010/0297029 A1 | 11/2010 | Biering |
| 2011/0009309 A1 | 1/2011 | Mertens |
| 2011/0081528 A1 | 4/2011 | Shannon |
| 2011/0091393 A1 | 4/2011 | Simmonds |
| 2011/0217345 A1 | 9/2011 | Huang et al. |
| 2011/0236447 A1 | 9/2011 | Yoshimura et al. |
| 2011/0293681 A1 | 12/2011 | Berlin |
| 2012/0046362 A1 | 2/2012 | Kawahara |
| 2012/0121459 A1 | 5/2012 | Edgington |
| 2012/0164206 A1 | 6/2012 | Soerens |
| 2012/0189558 A1 | 7/2012 | Prendergast |
| 2012/0207805 A1 | 8/2012 | Colman et al. |
| 2012/0263805 A1 | 10/2012 | Popp |
| 2012/0269912 A1 | 10/2012 | Roberts |
| 2012/0294911 A1 | 11/2012 | Redmond |
| 2012/0302634 A1 | 11/2012 | Veeger et al. |
| 2013/0025500 A1* | 1/2013 | Jones .................. C11D 3/3773 106/162.9 |
| 2013/0037048 A1 | 2/2013 | Edgington |

(56) References Cited

U.S. PATENT DOCUMENTS

| | | |
|---|---|---|
| 2013/0079733 A1 | 3/2013 | Burt et al. |
| 2013/0209576 A1 | 8/2013 | Brumeister |
| 2013/0274110 A1 | 10/2013 | Westbye |
| 2013/0287724 A1 | 10/2013 | Hoffman |
| 2014/0014584 A1 | 1/2014 | Cone |
| 2014/0030198 A1 | 1/2014 | Fares et al. |
| 2014/0147402 A1 | 5/2014 | Klug |
| 2014/0170089 A1 | 6/2014 | Thaggard |
| 2014/0205546 A1 | 7/2014 | Macoviak |
| 2014/0256688 A1 | 9/2014 | Lozinsky et al. |
| 2014/0275255 A1 | 9/2014 | Pedersen |
| 2014/0301961 A1 | 10/2014 | Gillbro et al. |
| 2014/0309173 A1 | 10/2014 | Dreher |
| 2014/0356303 A1 | 12/2014 | Rocco et al. |
| 2015/0010490 A1 | 1/2015 | Kim |
| 2015/0059795 A1 | 3/2015 | Vatter |
| 2015/0252293 A1 | 9/2015 | Vockenroth et al. |
| 2015/0265507 A1 | 9/2015 | Norman |
| 2015/0290102 A1 | 10/2015 | Cozean |
| 2015/0352033 A1 | 12/2015 | Hoffman et al. |
| 2016/0051452 A1 | 2/2016 | Nishizawa et al. |
| 2017/0015947 A1 | 1/2017 | Cermenati et al. |
| 2017/0042787 A1 | 2/2017 | Phukan et al. |
| 2017/0208798 A1 | 7/2017 | Chaudhary |
| 2017/0210900 A1 | 7/2017 | Engelbrecht |
| 2017/0224596 A1 | 8/2017 | Chaudhary |
| 2017/0303535 A1 | 10/2017 | Engelbrecht |
| 2017/0367350 A1 | 12/2017 | Koenig |
| 2018/0098536 A1 | 4/2018 | Koenig |
| 2018/0311127 A1 | 11/2018 | Padyachi et al. |
| 2018/0371374 A1 | 12/2018 | Hayward et al. |
| 2019/0133126 A1 | 5/2019 | Modak et al. |
| 2019/0175464 A1 | 6/2019 | Myers et al. |
| 2019/0177667 A1 | 6/2019 | Engelbrecht et al. |
| 2019/0262254 A1 | 8/2019 | Ansari et al. |
| 2020/0121568 A1 | 4/2020 | Foley |
| 2020/0131454 A1 | 4/2020 | Copeland et al. |
| 2020/0148897 A1 | 5/2020 | Kang et al. |
| 2020/0206277 A1 | 7/2020 | Whitlock et al. |
| 2020/0338139 A1 | 10/2020 | Majeed et al. |
| 2020/0354591 A1 | 11/2020 | Engelbrecht et al. |

FOREIGN PATENT DOCUMENTS

| | | |
|---|---|---|
| AU | 2019204536 B2 | 5/2020 |
| AU | 2019204543 B2 | 5/2020 |
| AU | 2014409811 B2 | 2/2021 |
| BR | 102013009302 A1 | 11/2014 |
| BR | 112015000275 B1 | 2/2021 |
| CA | 2934499 C | 11/2020 |
| CN | 101156830 B | 5/2010 |
| CN | 101856389 A | 10/2010 |
| CN | 102293802 A | 12/2011 |
| CN | 102450972 A | 5/2012 |
| CN | 102613214 A | 8/2012 |
| CN | 102784079 A | 11/2012 |
| CN | 102940590 A | 2/2013 |
| CN | 103013307 A | 4/2013 |
| CN | 103387894 A | 11/2013 |
| CN | 103830226 A | 6/2014 |
| CN | 103845244 A | 6/2014 |
| CN | 103865692 A | 6/2014 |
| CN | 104013682 A | 9/2014 |
| CN | 104559580 A | 4/2015 |
| CN | 103341204 B | 8/2015 |
| CN | 105086747 A | 11/2015 |
| CN | 105199602 A | 12/2015 |
| CN | 103237538 B | 1/2016 |
| CN | 103788812 B | 4/2016 |
| CN | 104177970 B | 8/2016 |
| CN | 105816345 A | 8/2016 |
| CN | 105924604 A | 9/2016 |
| CN | 106147306 A | 11/2016 |
| CN | 106147539 A | 11/2016 |
| CN | 106413670 A | 2/2017 |
| CN | 106413674 A | 2/2017 |
| CN | 107158485 A | 9/2017 |
| CN | 107550826 A | 1/2018 |
| CN | 108148474 A | 6/2018 |
| CN | 108610892 A | 10/2018 |
| CN | 108785119 A | 11/2018 |
| CN | 109010090 A | 12/2018 |
| CN | 109077946 A | 12/2018 |
| CN | 109321054 A | 2/2019 |
| CN | 109337508 A | 2/2019 |
| CN | 109350556 A | 2/2019 |
| CN | 109651907 A | 4/2019 |
| CN | 110003703 A | 7/2019 |
| CN | 110354296 A | 10/2019 |
| CN | 110381973 A | 10/2019 |
| CN | 110876715 A | 3/2020 |
| CN | 111032011 A | 4/2020 |
| CN | 111072098 A | 4/2020 |
| CN | 106572954 A | 6/2020 |
| CN | 108299667 A | 7/2020 |
| CN | 111593434 A | 8/2020 |
| CN | 108135876 B | 10/2020 |
| CN | 112386559 A | 2/2021 |
| EP | 1046390 A1 | 10/2000 |
| EP | 1543823 A | 6/2005 |
| EP | 1798279 A1 | 6/2007 |
| EP | 1633193 B1 | 5/2016 |
| EP | 1948124 B1 | 5/2016 |
| EP | 3120831 A1 | 1/2017 |
| EP | 3084066 B1 | 10/2017 |
| EP | 3243861 A1 | 11/2017 |
| EP | 3409112 A1 | 12/2018 |
| EP | 3261609 B1 | 4/2021 |
| GB | 1576136 A | 10/1980 |
| GB | 2097811 A | 11/1982 |
| GB | 2554000 A | 3/2018 |
| IL | 203403 | 11/2010 |
| IN | 107652394 A | 2/2018 |
| JP | 63007785 A2 | 1/1988 |
| JP | 10218940 A2 | 8/1998 |
| JP | 2000044419 A | 2/2000 |
| JP | 2000110099 A2 | 4/2000 |
| JP | 3965006 B2 | 8/2007 |
| JP | 2011153101 A | 8/2011 |
| JP | 2019119725 A | 7/2019 |
| KR | 1020100094508 A | 8/2010 |
| KR | 20110058754 A | 6/2011 |
| KR | 101376474 B1 | 3/2014 |
| KR | 101515865 B1 | 5/2015 |
| KR | 2017051006 A | 5/2017 |
| KR | 2059919 B1 | 12/2019 |
| KR | 2135648 B1 | 7/2020 |
| KR | 2021013582 A | 2/2021 |
| MX | 2014007137 A | 9/2014 |
| RU | 2452463 C1 | 6/2012 |
| RU | 2013131391 A | 1/2015 |
| RU | 2019110798 A | 11/2020 |
| WO | WO9400016 A1 | 1/1994 |
| WO | WO0128340 A2 | 4/2001 |
| WO | WO0132132 A2 | 5/2001 |
| WO | WO03066192 A1 | 8/2003 |
| WO | WO03092382 A1 | 11/2003 |
| WO | 04010783 A1 | 2/2004 |
| WO | WO04062703 A1 | 7/2004 |
| WO | WO06085975 A2 | 8/2006 |
| WO | 08123115 A1 | 10/2008 |
| WO | 2009036030 A1 | 3/2009 |
| WO | WO09065023 A1 | 5/2009 |
| WO | WO10056685 A2 | 5/2010 |
| WO | 2011079163 A1 | 6/2011 |
| WO | WO11083401 A2 | 7/2011 |
| WO | WO13016029 A1 | 1/2013 |
| WO | WO13052545 A1 | 4/2013 |
| WO | WO13066403 A1 | 5/2013 |
| WO | 2013089720 A1 | 6/2013 |
| WO | WO14032696 A1 | 3/2014 |
| WO | 2014098822 A1 | 6/2014 |
| WO | 2014098824 A1 | 6/2014 |
| WO | 2014098827 A1 | 6/2014 |

(56) References Cited

FOREIGN PATENT DOCUMENTS

| WO | 2014098829 A1 | 6/2014 |
|---|---|---|
| WO | 14103475 A1 | 7/2014 |
| WO | WO14113269 A1 | 7/2014 |
| WO | WO14139904 A1 | 9/2014 |
| WO | 14163075 A1 | 10/2014 |
| WO | 2015014818 A2 | 2/2015 |
| WO | WO15166075 A1 | 11/2015 |
| WO | WO16018473 A1 | 2/2016 |
| WO | WO16018474 A1 | 2/2016 |
| WO | WO16018475 A1 | 2/2016 |
| WO | WO16018476 A1 | 2/2016 |
| WO | 2016054021 A1 | 4/2016 |
| WO | 2016083798 A1 | 6/2016 |
| WO | 2016104602 A1 | 6/2016 |
| WO | 2016186896 A1 | 11/2016 |
| WO | 2017011665 A1 | 1/2017 |
| WO | 2017011679 A1 | 1/2017 |
| WO | 2017131691 A1 | 8/2017 |
| WO | 2019108218 A1 | 6/2019 |
| WO | 2019115806 A1 | 6/2019 |

OTHER PUBLICATIONS

Duan, P., Xu, Q., Zhang, X et al. Naturally occurring betaine grafted on cotton fabric for achieving antibacterial and anti-protein adsorption functions. Cellulose 27, 6603-6615 (2020). (Year: 2020).*

A. Pinazo, M.A. Manresa, A.M. Marques, M. Bustelo, M.J. Espuny, L. Pérez, Amino acid-based surfactants: New antimicrobial agents, Advances in Colloid and Interface Science, vol. 228, 2016, pp. 17-39. (Year: 2016).*

Kim, J. et al. (2016) "Candidacidal Activity of Xylitol and Sorbitol," Journal of Oral Medicine and Pain. Journal of Oral Medicine and Pain. (Year: 2016).*

Piquero-Casals, J., Morgado-Carrasco, D., Granger, C. et al. Urea in Dermatology: A Review of its Emollient, Moisturizing, Keratolytic, Skin Barrier Enhancing and Antimicrobial Properties. Dermatol Ther (Heidelb) 11, 1905-1915 (2021). (Year: 2021).*

Su LC, Xie Z, Zhang Y, Nguyen KT, Yang J. Study on the Antimicrobial Properties of Citrate-Based Biodegradable Polymers. Front Bioeng Biotechnol. Jul. 3, 2014;2:23. (Year: 2014).*

Datasheet for WetFilm™ by Inolex (downloaded Sep. 14, 2019 from https://inolexcosmetics.ulprospector.com/en/na/personalcare/details (Year: 2019).

Trimethylpentanediol-adipic acid-glycerin crosspolymer—Google search Sep. 13, 2019 (Year: 2019).

"Soy Based Sauce", Mintel GNPD, https://www.gnpd.com/sinatra/recordpage/2694235/?utm_source=fed_search, Published Sep. 2014.

"Ginkgo Green Tea Drink", Mintel GNPD, https://www.gnpd.com/sinatra/recordpage/2683087/?utm_source=fed_search, Published Sep. 2014.

"June Premium Soy Sauce", Mintel GNPD, https://www.gnpd.com/sinatra/recordpage/2696123/?utm_source=fed_search, Published Sep. 2014.

Shan et al, "Antibacterial properties of Polygonum cuspidatum roots and their major bioactive consitiuents," Food Chemistry 109 (2008) 530-537.

Katsikogianni, M. and Y.F. Missirlis, "Concise Review of Mechanisms of Bacterial Adhesion to Biomaterials and of Techniques Used in Estimating Bacteria-Material Interactions," European Cells and Materials, vol. 8, University of Patras, Patras, Greece, Dec. 2004, pp. 37-57.

Co-pending U.S. Appl. No. 16/011,248, filed Jun. 18, 2018, by Chaudhary et al. for "Anti-Adherent Alcohol-Based Composition."

Co-pending U.S. Appl. No. 16/071,343, filed Jul. 19, 2018, by Engelbrecht et al. for "Adherent Composition for RNA Viruses and Method of Removing RNA Viruses from a Surface."

Google Scholar Search, "Pyrogenic Silica Antimicrobial", Aug. 3, 2020, (Year: 2020).

Google Scholar Search, "Pyrogenic Silica", Aug. 3, 2020 (Year: 2020).

Hwang et al (Resveratrol antibacterial activity against *Escherichia coli* is mediated by Z-ring formation inhibition via suppression of FtsZ expression. Scientific Reports vol. 5, Article No. 10029 (2015) (Year: 2015).

Al-Waili et al (Honey and microbial infections: a review supporting the use of honey for microbial control. J Med Food. Oct. 2011; 14 (10):1079-96) (Year: 2011).

Pathak, Rahul et al., "Inhibition of bacterial attachment and biofilm formation by a novel intravenous catheter material using an in vitro percutaneous catheter insertion model", Medical Devices: Evidence and Research, 2018, https://www.ncbi.nlm.nih.gov/pmc/articles/PMC6305250/pdf/mder-11-427.pdf.

Engelbrecht, Kathleen C. et al., "The effect of select personal care ingredients and simple formulations on the attachment of bacteria on polystyrene", Cosmetics, Jul. 10, 2018, https://www.google.com/url?sa=t&rct=j&q=&esrc=s&source=web&cd=&ved=2ahUKEwjrzJiBrf3wAhU_wTgGHS30AH4QFjABegQIAhAD&url=https%3A%2F%2Fwww.mdpi.com%2F2079-9284%2F5%2F3%2F42%2Fpdf&usg=AOvVaw3ydupZOmoa9eFNSUaUskfW.

Wang, Yi et al., "Epigallocatechin gallate and gallic acid affect colonization of abiotic surfaces by oral bacteria", Arch Oral Biol., Dec. 2020, https://pubmed.ncbi.nlm.nih.gov/33045616/.

Sharifzadeh, Aghil et al. , "Anti-adherence and Anti-fungal Abilities of Thymol and Carvacrol Against *Candida* Species Isolated From Patients with Oral Candidiasis in Comparison with Fluconazole and Voriconazole", Jundishapur Journal of Natural Pharmaceutical Products, Feb. 1, 2021, https://sites.kowsarpub.com/jnpp/articles/65005.html.

Romera, D. et al., "Reduction of Adherence of Strictly Anaerobic Bacteria on Fluorine-Doped Titanium", Orthopaedic Proceedings, vol. 100-B, No. SUPP_3, Apr. 5, 2018, https://online.boneandjoint.org.uk/doi/abs/10.1302/1358-992X.2018.3.060.

He, Jiankang et al. , "Nanocomplexes of carboxymethyl chitosan/amorphous calcium phosphate reduce oral bacteria adherence and biofilm formation on human enamel surface", J Dent. Jan. 2019, https://pubmed.ncbi.nlm.nih.gov/30423355/.

Kemung, Hefa Mangzira et al., "An Optimized Anti-adherence and Anti-biofilm Assay: Case Study of Zinc Oxide Nanoparticles versus MRSA Biofilm", Research Gate, Jun. 2020, https://www.researchgate.net/publication/342364559_An_Optimized_Anti-adherence_and_Anti-biofilm_Assay_Case_Study_of_Zinc_Oxide_Nanoparticles_versus_MRSA_Biofilm/link/5f2beb14299bf13404a61bda/download.

Simon, Gaelle et al., "Anti-biofilm and anti-adherence properties of novel cyclic dipeptides against oral pathogens", Bioorganic & Medicinal Chemistry, vol. 27, Issue 12, Jun. 2019, https://www.sciencedirect.com/science/article/abs/pii/S0968089618316547.

Abbas, Mohammed I. et al., "Surface Bacterial Adhesion Study of Novel Ternary PVC/ Polyester/ Bentonite Clay Nanocomposite Films", Current Physical Chemistry, vol. 11, Issue 1, 2021, https://www.eurekaselect.com/node/182844/article/surface-bacterial-adhesion-study-of-novel-ternary-pvc-polyester-bentonite-clay-nanocomposite-films.

Wang, Xiaodie et al., "Casein phosphopeptide combined with fluoride enhances the inhibitory effect on initial adhesion of *Streptococcus mutans* to the saliva-coated hydroxyapatite disc", BMC Oral Health, Article No. 169, 2020, https://bmcoralhealth.biomedcentral.com/articles/10.1186/s12903-020-01158-8.

Kerk, Swat Kim et al., "Bacteria Display Differential Growth and Adhesion Characteristics on Human Hair Shafts", Front Microbiol, 2018, https://www.ncbi.nlm.nih.gov/pmc/articles/PMC6137140/pdf/fmicb-09-02145.pdf.

Goc, Anna et al., "10-undecynoic acid is a new anti-adherent agent killing biofilm of oral Streptococcus spp." Plos One, Apr. 18, 2019, https://journals.plos.org/plosone/article?id=10.1371/journal.pone.0214763.

Prabha, Subramani et al., "Chitosan-Coated Surgical Sutures Prevent Adherence and Biofilms of Mixed Microbial Communities", Current Microbiology, 2021, https://link.springer.com/article/10.1007/s00284-020-02306-7.

Jardak, Marwa et al., "Chemical composition, antibiofilm activities of Tunisian spices essential oils and combinatorial effect against

(56) References Cited

OTHER PUBLICATIONS

*Staphylococcus epidermidis* biofilm", LWT, vol. 140, Apr. 2021, https://www.sciencedirect.com/science/article/abs/pii/S0023643820316790.

Kurniawan, Febrian Hendra et al., "Hydrophobic and antibacterial bed sheet using ZnO nanoparticles: A large-scale technique", Journal of Drug Delivery Science and Technology, vol. 62, Apr. 2021, https://www.sciencedirect.com/science/article/abs/pii/S1773224721000204.

Irwin, Nicola J. et al., "Infection-Triggered, Self-Cleaning Surfaces with On-Demand Cleavage of Surface-Localized Surfactant Moieties" ACS Biomater Sci Eng. Feb. 8, 2021, https://pubmed.ncbi.nlm.nih.gov/33502846/.

Sharifzadeh, Aghil et al., "Anti-adherence and anti-fungal abilities of thymol and carvacrol against *Candida* species Isolated from patients with oral candidiasis in comparison with fluconazole and voriconazole", Jundishapur Journal of Natural Pharmaceutical Products, Feb. 1, 2021.

Dera, Ayed A. et al., "Synergistic efficacies of thymoquinone and standard antibiotics against multi-drug resistant isolates", Saudi Med J., Feb. 2021, https://www.ncbi.nlm.nih.gov/pmc/articles/PMC7989283/.

Lencova, Simona et al., "Bacterial biofilms on polyamide nanofibers: Factors influencing biofilm formation and evaluation", ACS Publications, Dec. 7, 2020, https://pubs.acs.org/doi/pdf/10.1021/acsami.0c19016.

Rubini, Durairajan et al., "Chitosan coated catheters alleviates mixed species biofilms of *Staphylococcus epidermidis* and Candida albicans", Carbogydr Polym, Jan. 15, 2021, https://pubmed.ncbi.nlm.nih.gov/33183634/.

Habib, Salma et al., "Slippery liquid-infused porous polymeric surfaces based on natural oil with antimicrobial effect", Polymers, Jan. 2021, https://www.ncbi.nlm.nih.gov/pmc/articles/PMC7826890/pdf/polymers-13-00206.pdf.

Tektas, Sibel et al., "Initial bacterial adhesion and biofilm formation on aligner materials", Antibiotics, Dec. 15, 2020, https://www.ncbi.nlm.nih.gov/pmc/articles/PMC7765154/pdf/antibiotics-09-00908.pdf.

Li, Xin et al., "Synthesis and Characterization of Hydrophobic Polystyrene Microspheres Film", Synthesis, Dec. 30, 2020, https://link.springer.com/article/10.1134/S1560090420060056.

Zheng, Kaiyuan et al., "Synergistic Antimicrobial Titanium Carbide (MXene) Conjugated with Gold Nanoclusters", Advanced Health Care Materials, Sep. 30, 2020, https://onlinelibrary.wiley.com/doi/abs/10.1002/adhm.202001007.

Sautrot-BA, Pauline et al., "Photoinduced synthesis of antibacterial hydrogel from aqueous photoinitiating system", European Polymer Journal, vol. 138, Sep. 5, 2020, https://www.sciencedirect.com/science/article/abs/pii/S0014305720316505.

Singh, Amit Kumar et al., "Efficacy of Azadirachta indica essential oil bio-compounds against csuE among acinetobacter baumannii— An in-silico analysis", I.K. Press, vol. 21, Issue 33-34, Aug. 26, 2020, https://www.ikprress.org/index.php/PCBMB/article/view/5371.

Nelson, Jakline et al., "The biosurfactants iturin, lichenysin and surfactin, from vaginally isolated lactobacilli, prevent biofilm formation by pathogenic Candida", FEMS Microbiol Lett., Aug. 1, 2020, https://pubmed.ncbi.nlm.nih.gov/32710776/.

Rodrigues, Jeisa Zielle de Souza et al., "Antimicrobial activity of Lactobacillus fermentum TcUESC01 against *Streptococcus mutans* UA159", Microb Pathog, Feb. 24, 2020, https://pubmed.ncbi.nlm.nih.gov/32061821/.

Kokilakanit, P. et al., "A novel non-cytotoxic synthetic peptide, Pug-1, exhibited an antibiofilm effect on *Streptococcus mutans* adhesion", Lett Appl Microbiol, Mar. 2020, https://pubmed.ncbi.nlm.nih.gov/31837275/.

Modjinou, Tina et al., "Co-networks poly(Hydroxyalkanoates)-terpenes to enhance antibacterial properties", Bioengineering, Mar. 2020, https://www.ncbi.nlm.nih.gov/pmc/articles/PMC7148494/pdf/bioengineering-07-00013.pdf.

Boix-Lemonche, Gerard et al., "Covalent grafting of titanium with a cathelicidin peptide produces an osteoblast compatible surface with antistaphylococcal activity", Colloids and Surfaces B: Biointerfaces, vol. 185, Jan. 1, 2020, https://www.sciencedirect.com/science/article/abs/pii/S0927776519307301.

Arenas-Vivo, Ana et al., "An Ag-loaded photoactive nano-metal organic framework as a promising biofilm treatment", Acta Biomaterialia, vol. 97, Oct. 1, 2019, https://www.sciencedirect.com/science/article/abs/pii/S1742706119305586.

Cui, Xinnan et al., "Bacterial Inhibition and Osteoblast Adhesion on Ti Alloy Surfaces Modified by Poly(PEGMA-r-Phosmer) Coating", ACS Publications, Jun. 26, 2018, https://pubs.acs.org/doi/pdf/10.1021/acsami.8b07757.

Mortazavian, Hamid et al., "Understanding the role of shape and composition of star-shaped polymers and their ability to both bind and prevent bacteria attachment on oral relevant surfaces", J Funct Biomater, Dec. 17, 2019, https://www.ncbi.nlm.nih.gov/pmc/articles/PMC6963222/pdf/jfb-10-00056.pdf.

Marine, Jeannette et al., "Reduction of bacterial attachment on hydroxyapatite surfaces: Using hydrophobicity and chemical functionality to enhance surface retention and prevent attachment", Colloids Surf B Biointerfaces, Jul. 1, 2018, https://pubmed.ncbi.nlm.nih.gov/29730574/.

Mahyudin, Nor Ainy et al., "Bacterial attachment and biofilm formation on stainless steel surface and their in vitro inhibition by marine fungal extracts", Journal of Food Safety, Mar. 1, 2018, https://onlinelibrary.wiley.com/doi/abs/10.1111/jfs.12456.

Pitusiak, Ewelina, "Skin Care Formulations with Structure (RTM) Cell Thickeners", Nov. 18, 2011.

Al-Saedi, Fitua Minuar Aziz et al., "Development of a bacterial adhesin into a next generation antimicrobial agent" University of Birmingham, 2018, https://etheses.bham.ac.uk/id/eprint/8215/.

Draelos et al., "A New Proprietary Onion Extract Gel Improves the Appearance of New Scars," Clinical Aesthetic Dermatology, Jun. 2012, vol. 6, No. 6. p. 18-24.

CVS, "Mederma Advanced Scar Gel Ingredients", 2021, https://www.cvs.com/shop/ingredients/mederma-advanced-scar-gel-prodid-210683.

Greive, K.A. et al., "In vitro comparison of four treatments which discourage infestation by head lice", Parasitol Res (2012) 110:1695-1699.

\* cited by examiner

ANTI-ADHERENT COMPOSITION AGAINST DNA VIRUSES AND METHOD OF INHIBITING THE ADHERENCE OF DNA VIRUSES TO A SURFACE

TECHNICAL FIELD

Disclosed is a composition with anti-adherent properties. More specifically, disclosed is a composition that includes an anti-adherent agent that inhibits the adherence of DNA viruses to a surface. The composition may be applied to or incorporated into articles such as wipes, or into ointments, lotions, creams, salves, aerosols, gels, suspensions, sprays, foams, washes, or the like.

BACKGROUND OF THE DISCLOSURE

Communicable human infections pass from person to person through various means such as food, aerosols, surfaces and hands. For example, in the United States, foodborne pathogens alone cause an estimated 76 million cases of illness, 325,000 hospitalizations and 5,000 deaths per year. This results in the spending or loss of several billion dollars due to absenteeism, cost of medication, and hospitalization.

Foodborne pathogens are typically a result of poor cleaning of hands and surfaces on which food is prepared. In fact, the kitchen is one of the most contaminated sites in the home. High fecal and coliform concentrations can be found in sponges, dishcloths, and the kitchen sink. Of course, there are other pathogens lurking elsewhere in the home, at the office, and in public places such as public bathrooms, restaurants, malls, theaters, health-care facilities, etc. Such pathogens include bacteria, protein, active enzymes, viruses, and many other microbes that can lead to health problems. DNA viruses, including the adenovirus, are among these pathogens that can be spread and lead to health problems, such as the common cold, sore throats, pneumonia, and diarrhea. Other DNA viruses include herpes viruses, such as HSV-1, HSV-2, cytomegalovirus, and Epstein-Barr. Other DNA viruses can lead to diseases such as smallpox and chickenpox. DNA viruses, like other pathogens, can be commonly spread by shaking hands with infected people or touching a surface or object with DNA viruses on it.

There are products used today that are used to clean skin and hard surfaces where pathogens may be deposited, such as soaps, hand sanitizers, sprays and wipes. However, even the most diligent efforts to keep clean can be hindered by factors such as surface topography, the presence of hair, and the like. These factors can cause pathogens to better adhere to a surface. Other limiting factors include skin sensitivity due to the handling of cleaning products or the application thereof.

There remains a need for compositions that can be applied to surfaces or incorporated into articles, wherein the compositions inhibit the adherence of DNA viruses. Desirably, the compositions are skin friendly, cost effective, and convenient to use.

SUMMARY OF THE DISCLOSURE

In one aspect of the disclosure, a composition for inhibiting the attachment of DNA viruses to a surface can include a liquid carrier, an anti-adherent agent, and a humectant. The anti-adherent agent can include C12-16 Alkyl PEG-2 Hydroxypropyl Hydroxyethyl Ethylcellulose.

In another aspect of the disclosure, a method for inhibiting the adherence of DNA viruses to a surface can include providing a composition. The composition can include an anti-adherent agent. The anti-adherent agent can include C12-16 Alkyl PEG-2 Hydroxypropyl Hydroxyethyl Ethylcellulose. The method can further include applying the composition to the surface to inhibit the adherence of DNA viruses to the surface.

In still another aspect of the disclosure a wipe for inhibiting the attachment of DNA viruses to a surface can include a nonwoven substrate and a composition. The composition can include a composition including a liquid carrier and an anti-adherent agent. The anti-adherent agent can include C12-16 Alkyl PEG-2 Hydroxypropyl Hydroxyethyl Ethylcellulose.

DETAILED DESCRIPTION OF THE DISCLOSURE

The present disclosure is directed to an anti-adherent composition containing an anti-adherent agent and a carrier that inhibits the adherence of DNA viruses to a surface and a method of inhibiting the adherence of DNA viruses to a surface. The composition may be applied to a surface in the form of a liquid, gel, or foam; or incorporated into a wash. In addition, the composition may be applied to a surface with a vehicle such as a wipe.

The anti-adherent composition may be used on biotic surfaces such as skin or plants; or abiotic surfaces such as food prep surfaces; hospital and clinic surfaces; household surfaces; automotive, train, ship and aircraft surfaces; and the like; as long as the surface is compatible with the ingredients of the composition. Applying the anti-adherent composition to such surfaces can help prevent the amount or the likelihood that DNA viruses will adhere to those surfaces, thus, lessening the likelihood of further transferring of the virus.

Importantly, some embodiments of the anti-adherent composition of the present disclosure are not antimicrobial. In other words, in some embodiments the anti-adherent composition does not include any antimicrobial agents. In such embodiments, the anti-adherent composition seeks to prevent attachment of DNA viruses to a surface, not eradicate the DNA viruses and any other microbes. This distinction can provide a benefit for the effectiveness for preventing the further spreading of DNA viruses as concerns grow about the increasing microbial resistance to common antimicrobial treatments. However, in some embodiments, as will be discussed further below, it is contemplated that the anti-adherent composition can include antimicrobial agents.

According to the High Throughput Test to Quantify the Attachment of Phage to a Surface (discussed further below), the anti-adherent composition reduces adherence of DNA viruses to a surface by at least 0.25 Log, or by at least 0.29 Log.

Anti-Adherent Agents for DNA Viruses

Anti-adherent agents suitable for use in the composition can include $C_{12-16}$ Alkyl PEG-2 Hydroxypropyl Hydroxyethyl Ethylcellulose. $C_{12-16}$ Alkyl PEG-2 Hydroxypropyl Hydroxyethyl Ethylcellulose is a hydrophobically modified ethyl hydroxyethyl cellulose (HM-EHEC) commercially available under the name STRUCTURE CEL 500 HM from AkzoNobel. As shown in the High Throughput Test to Quantify the Attachment of Phage to a Surface (as discussed further below), $C_{12-16}$ Alkyl PEG-2 Hydroxypropyl Hydroxyethyl Ethylcellulose was the only agent of many different agents tested that provided the unique result of inhibiting the attachment of DNA viruses to a surface but providing an increase in adherence of bacteria to a surface. Most of the agents that provided an increase in adherence to bacteria provided an increase in adherence of DNA viruses as well, as expected. Additionally, most of the agents that inhibited the adherence of bacteria, also inhibited the adherence of DNA viruses. Thus, the anti-adherent effect of $C^{12-16}$ Alkyl PEG-2 Hydroxypropyl Hydroxyethyl Ethylcellulose against DNA viruses provided a surprising result.

Some embodiments of the anti-adherent compositions of the present disclosure can be suitably made with an anti-adherent agent in an amount of from about 0.01% (by the total weight of the composition), to about 20% (by total weight of the composition), or preferably from about 0.05% (by total weight of the composition) to about 15% (by total weight of the composition), or more preferably from about 0.1% (by total weight of the composition) to about 10% (by total weight of the composition). In one preferred embodiment, the anti-adherent composition included 1.5% of an anti-adherent agent by total weight of the composition.

Carriers

The anti-adherent compositions of the present disclosure may be formulated with one or more conventional and compatible carrier materials. The anti-adherent composition may take a variety of forms including, without limitation, aqueous solutions, gels, balms, lotions, suspensions, creams, milks, salves, ointments, sprays, emulsions, oils, resins, foams, solid sticks, aerosols, and the like. Liquid carrier materials suitable for use in the instant disclosure include those well-known for use in the cosmetic and medical arts as a basis for ointments, lotions, creams, salves, aerosols, gels, suspensions, sprays, foams, washes, and the like, and may be used in their established levels.

Non-limiting examples of suitable carrier materials include water, emollients, humectants, polyols, surfactants, esters, perflurocarbons, silicones, and other pharmaceutically acceptable carrier materials. In one embodiment, the carrier is volatile, allowing for immediate deposition of the anti-adherent ingredient to the desired surface while improving overall usage experience of the product by reducing drying time. Non-limiting examples of these volatile carriers include 5 cst Dimethicone, Cyclomethicone, Methyl Perfluoroisobutyl Ether, Methyl Perfluorobutyl Ether, Ethyl Perfluoroisobutyl Ether and Ethyl Perfluorobutyl Ether. Unlike conventional volatile carriers such as ethanol or isopropyl alcohol, these carriers have no antimicrobial effect.

In one embodiment, the anti-adherent compositions can optionally include one or more emollients, which typically act to soften, soothe, and otherwise lubricate and/or moisturize the skin. Suitable emollients that can be incorporated into the compositions include oils such as alkyl dimethicones, alkyl methicones, alkyldimethicone copolyols, phenyl silicones, alkyl trimethylsilanes, dimethicone, dimethicone crosspolymers, cyclomethicone, lanolin and its derivatives, fatty esters, glycerol esters and derivatives, propylene glycol esters and derivatives, alkoxylated carboxylic acids, alkoxylated alcohols, fatty alcohols, and combinations thereof.

Some embodiments of the anti-adherent compositions may include one or more emollients in an amount of from about 0.01% (by total weight of the composition) to about 20% (by total weight of the composition), or from about 0.05% (by total weight of the composition) to about 10% (by total weight of the composition), or from about 0.10% (by total weight of the composition) to about 5% (by total weight of the composition).

In another embodiment the anti-adherent compositions include one or more esters. The esters may be selected from cetyl palmitate, stearyl palmitate, cetyl stearate, isopropyl laurate, isopropyl myristate, isopropyl palmitate, and combinations thereof. The fatty alcohols include octyldodecanol, lauryl, myristyl, cetyl, stearyl, behenyl alcohol, and combinations thereof. Ethers such as eucalyptol, ceteraryl glucoside, dimethyl isosorbic polyglyceryl-3 cetyl ether, polyglyceryl-3 decyltetradecanol, propylene glycol myristyl ether, and combinations thereof can also suitably be used as emollients. Other suitable ester compounds for use in the anti-adherent compositions or the present disclosure are listed in the *International Cosmetic Ingredient Dictionary and Handbook,* 11th Edition, CTFA, (January, 2006) ISBN-10: 1882621360, ISBN-13: 978-1882621361, and in the 2007 *Cosmetic Bench Reference*, Allured Pub. Corporation (Jul. 15, 2007) ISBN-10: 1932633278, ISBN-13: 978-1932633276, both of which are incorporated by reference herein to the extent they are consistent herewith.

Humectants that are suitable as carriers in the anti-adherent compositions of the present disclosure include, for example, glycerin, glycerin derivatives, hyaluronic acid, hyaluronic acid derivatives, betaine, betaine derivatives amino acids, amino acid derivatives, glycosaminoglycans, glycols, polyols, sugars, sugar alcohols, hydrogenated starch hydrolysates, hydroxy acids, hydroxy acid derivatives, salts of PCA and the like, and combinations thereof. Specific examples of suitable humectants include honey, sorbitol, hyaluronic acid, sodium hyaluronate, betaine, lactic acid, citric acid, sodium citrate, glycolic acid, sodium glycolate, sodium lactate, urea, propylene glycol, butylene glycol, pentylene glycol, ethoxydiglycol, methyl gluceth-10, methyl gluceth-20, polyethylene glycols (as listed in the *International Cosmetic Ingredient Dictionary and Handbook* such as PEG-2 through PEG 10), propanediol, xylitol, maltitol, or combinations thereof. Humectants are beneficial in that they prevent or reduce the chance that the anti-adherent film, formed after the anti-adherent agent is applied to a surface, will crack.

The anti-adherent compositions of the disclosure may include one or more humectants in an amount of about 0.01% (by total weight of the composition) to about 20% (by total weight of the composition), or about 0.05% (by total weight of the composition) to about 10% by total weight of the composition), or about 0.1% (by total weight of the composition) to about 5.0% (by total weight of the composition).

The anti-adherent compositions may include water. For instance, where the anti-adherent composition is a wetting composition, such as described below for use with a wet wipe, the composition will typically include water. The anti-adherent compositions can suitably comprise water in an amount of from about 0.01% (by total weight of the composition) to about 99.98% (by total weight of the composition), or from about 1.00% (by total weight of the composition) to about 99.98% (by total weight of the composition), or from about 50.00% (by total weight of the composition) to about 99.98% (by total weight of the composition), or from about 75.00% (by total weight of the composition) to about 99.98% (by total weight of the composition).

In an embodiment where the anti-adherent composition serves as a wash (e.g. shampoo; surface cleaner; or hand, face, or body wash), the anti-adherent composition will include one or more surfactants. These may be selected from anionic, cationic, nonionic, zwitterionic, and amphoteric surfactants. Amounts may range from 0.1 to 30%, or from 1 to 20%, or from 3 to 15% by total weight of the composition.

Suitable anionic surfactants include, but are not limited to, $C_8$ to $C_{22}$ alkane sulfates, ether sulfates and sulfonates. Among the suitable sulfonates are primary $C_8$ to $C_{22}$ alkane sulfonate, primary $C_8$ to $C_{22}$ alkane disulfonate, $C_8$ to $C_{22}$ alkene sulfonate, $C_8$ to $C_{22}$ hydroxyalkane sulfonate or alkyl glyceryl ether sulfonate. Specific examples of anionic surfactants include ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium laureth sulfate, sodium lauryl sarcosinate, sodium lauroyl sarcosinate, potassium lauryl sulfate, sodium trideceth sulfate, sodium methyl lauroyl taurate, sodium lauroyl isethionate, sodium laureth sulfosuccinate, sodium lauroyl sulfosuccinate, sodium tridecyl benzene sulfonate, sodium dodecyl benzene sulfonate, sodium lauryl amphoacetate and mixtures thereof. Other anionic surfactants include the $C_8$ to $C_{22}$ acyl glycinate salts. Suitable glycinate salts include sodium cocoylglycinate, potassium cocoylglycinate, sodium lauroylglycinate, potassium lauroylglycinate, sodium myristoylglycinate, potassium myristoylglycinate, sodium palmitoylglycinate, potassium palmitoylglycinate, sodium stearoylglycinate, potassium stearoylglycinate, ammonium cocoylglycinate and mixtures thereof. Cationic counter-ions to form the salt of the glycinate may be selected from sodium, potassium, ammonium, alkanolammonium and mixtures of these cations.

Suitable cationic surfactants include, but are not limited to alkyl dimethylamines, alkyl amidopropylamines, alkyl imidazoline derivatives, quaternised amine ethoxylates, and quaternary ammonium compounds.

Suitable nonionic surfactants include, but are not limited to, alcohols, acids, amides or alkyl phenols reacted with alkylene oxides, especially ethylene oxide either alone or with propylene oxide. Specific nonionics are $C_6$ to $C_{22}$ alkyl phenols-ethylene oxide condensates, the condensation products of $C_8$ to $C_{13}$ aliphatic primary or secondary linear or branched alcohols with ethylene oxide, and products made by condensation of ethylene oxide with the reaction products of propylene oxide and ethylenediamine. Other nonionics include long chain tertiary amine oxides, long chain tertiary phosphine oxides and dialkyl sulphoxides, alkyl polysaccharides, amine oxides, block copolymers, castor oil ethoxylates, ceto-oleyl alcohol ethoxylates, ceto-stearyl alcohol ethoxylates, decyl alcohol ethoxylates, dinonyl phenol ethoxylates, dodecyl phenol ethoxylates, end-capped ethoxylates, ether amine derivatives, ethoxylated alkanolamides, ethylene glycol esters, fatty acid alkanolamides, fatty alcohol alkoxylates, lauryl alcohol ethoxylates, mono-branched alcohol ethoxylates, natural alcohol ethoxylates, nonyl phenol ethoxylates, octyl phenol ethoxylates, oleyl amine ethoxylates, random copolymer alkoxylates, sorbitan ester ethoxylates, stearic acid ethoxylates, stearyl amine ethoxylates, synthetic alcohol ethoxylates, tall oil fatty acid ethoxylates, tallow amine ethoxylates and trid tridecanol ethoxylates.

Suitable zwitterionic surfactants include, for example, alkyl amine oxides, silicone amine oxides, and combinations thereof. Specific examples of suitable zwitterionic surfactants include, for example, 4-[N,N-di(2-hydroxyethyl)-N-octadecylammonio]-butane-1-carboxylate, S-[S-3-hydroxypropyl-S-hexadecylsulfonio]-3-hydroxypentane-1-sulfate, 3-[P,P-diethyl-P-3,6,9-trioxatetradexopcylphosphonio]-2-hydroxypropane-1-phosphate, 3-[N,N-dipropyl-N-3-dodecoxy-2-hydroxypropylammonio]-propane-1-phosphonate, 3-(N,N-dimethyl-N-hexadecylammonio)propane-1-sulfonate, 3-(N,N-dimethyl-N-hexadecylammonio)-2-hydroxypropane-1-sulfonate, 4-[N,N-di(2-hydroxyethyl)-N-(2-hydroxydodecyl)ammonio]-butane-1-carboxylate, 3-[S-ethyl-S-(3-dodecoxy-2-hydroxypropyl)sulfonio]-propane-1-phosphate, 3-[P,P-dimethyl-P-dodecylphosphonio]-propane-1-phosphonate, 5-[N,N-di(3-hydroxypropyl)-N-hexadecylammonio]-2-hydroxy-pentane-1-sulfate, and combinations thereof.

Suitable amphoteric surfactants include, but are not limited to, derivatives of aliphatic quaternary ammonium, phosphonium, and sulfonium compounds, in which the aliphatic radicals can be straight or branched chain, and wherein one of the aliphatic substituents contains from about 8 to about 18 carbon atoms and one substituent contains an anionic group, e.g., carboxy, sulfonate, sulfate, phosphate, or phosphonate. Illustrative amnphoterics are coco dimethyl carboxymethyl betaine, cocoamidopropyl betaine, cocobetaine, oleyl betaine, cetyl dimethyl carboxymethyl betaine, lauryl bis-(2-hydroxyethyl) carboxymethyl betaine, stearyl bis-(2-hydroxypropyl) carboxymethyl betaine, oleyl dimethyl gamma-carboxypropyl betaine, lauryl bis-(2-hydroxypropyl)alpha-carboxyethyl betaine, cocoamphoacetates, and combinations thereof. The sulfobetaines may include stearyl dimethyl sulfopropyl betaine, lauryl dimethyl sulfoethyl betaine, lauryl bis-(2-hydroxyethyl) sulfopropyl betaine and combinations thereof.

Rheology Modifier

Optionally, one or more rheology modifiers, such as thickeners, may be added to the anti-adherent compositions. Suitable rheology modifiers are compatible with the anti-adherent agent. As used herein, "compatible" refers to a compound that, when mixed with the anti-adherent agent, does not adversely affect the anti-adherent properties of same.

A thickening system is used in the anti-adherent compositions to adjust the viscosity and stability of the compositions. Specifically, thickening systems prevent the composition from running off of the hands or body during dispensing and use of the composition. When the anti-adherent composition is used with a wipe product, a thicker formulation can be used to prevent the composition from migrating from the wipe substrate.

The thickening system should be compatible with the compounds used in the present disclosure; that is, the thickening system, when used in combination with the anti-adherent compounds, should not precipitate out, form a coacervate, or prevent a user from perceiving the conditioning benefit (or other desired benefit) to be gained from the composition. The thickening system may include a thickener which can provide both the thickening effect desired from the thickening system and a conditioning effect to the user's skin.

Thickeners may include, cellulosics, gums, acrylates, starches and various polymers. Suitable examples include are not limited to hydroxethyl cellulose, xanthan gum, guar gum, potato starch, and corn starch. In some embodiments, PEG-150 stearate, PEG-150 distearate, PEG-175 diisostearate, polyglyceryl-10 behenate/eicosadioate, disteareth-100 IPDI, polyacrylamidomethylpropane sulfonic acid, butylated PVP, and combinations thereof may be suitable.

While the viscosity of the compositions will typically depend on the thickener used and the other components of the compositions, the thickeners of the compositions suitably provide for a composition having a viscosity in the range of greater than 10 cP to about 30,000 cP or more. In another embodiment, the thickeners provide compositions having a viscosity of from about 100 cP to about 20,000 cP. In yet another embodiment, thickeners provide compositions having a viscosity of from about 200 cP to about 15,000 cP.

Typically, the anti-adherent compositions of the present disclosure include the thickening system in an amount of no more than about 20% (by total weight of the composition), or from about 0.01% (by total weight of the composition) to about 20% (by total weight of the composition). In another aspect the thickening system is present in the anti-adherent composition in an amount of from about 0.10% (by total weight of the composition) to about 10% (by total weight of the composition), or from about 0.25% (by total weight of the composition) to about 5% (by total weight of the composition), or from about 0.5% (by total weight of the composition) to about 2% (by total weight of the composition).

Foaming Agents

In one embodiment, the anti-adherent compositions can be delivered as a foam. In accordance with the present disclosure, in order to make the composition foamable, the composition is combined with a foaming agent such as at least one derivatized dimethicone.

The foaming agent is capable of causing the compositions to foam when the compositions are combined with air using, for instance, a manual pump dispenser. Although the anti-adherent compositions may be dispensed from an aerosol container, an aerosol is not needed in order to cause the compositions to foam. Also of particular advantage, the compositions are foamable without having to include fluorinated surfactants.

Various different derivatized dimethicone foaming agents may be used in the compositions of the present disclosure. The derivatized dimethicone, for instance, may comprise a dimethicone copolyol, such as an ethoxylated dimethicone. In one embodiment, the derivatized dimethicone is linear, although branched dimethicones may be used.

The amount of foaming agent present in the foaming compositions can depend upon various factors and the desired result. In general, the foaming agent can be present in an amount from about 0.01% to about 10% (by total weight of the composition), or from about 0.1% to about 5% (by total weight of the composition), or from about 0.1% to about 2% (by total weight of the composition).

When an anti-adherent composition is made foamable, it may be contained in an aerosol container. In an aerosol container, the composition is maintained under pressure sufficient to cause foam formation when dispensed.

Emulsifiers

In one embodiment, the anti-adherent compositions may include hydrophobic and hydrophilic ingredients, such as a lotion or cream. Generally, these emulsions have a dispersed phase and a continuous phase, and are generally formed with the addition of a surfactant or a combination of surfactants with varying hydrophilic/lipopiliclipophilic balances (HLB). Suitable emulsifiers include surfactants having HLB values from 0 to 20, or from 2 to 18. Suitable non-limiting examples include Ceteareth-20, Cetearyl Glucoside, Ceteth-10, Ceteth-2, Ceteth-20, Cocamide MEA, Glyceryl Laurate, Glyceryl Stearate, PEG-100 Stearate, Glyceryl Stearate, Glyceryl Stearate SE, Glycol Distearate, Glycol Stearate, Isosteareth-20, Laureth-23, Laureth-4, Lecithin, Methyl Glucose Sesquistearate, Oleth-10, Oleth-2, Oleth-20, PEG-100 Stearate, PEG-20 Almond Glycerides, PEG-20 Methyl Glucose Sesquistearate, PEG-25 Hydrogenated Castor Oil, PEG-30 Dipolyhydroxystearate, PEG-4 Dilaurate, PEG-40 Sorbitan Peroleate, PEG-60 Almond Glycerides, PEG-7 Olivate, PEG-7 Glyceryl Cocoate, PEG-8 Dioleate, PEG-8 Laurate, PEG-8 Oleate, PEG-80 Sorbitan Laurate, Polysorbate 20, Polysorbate 60, Polysorbate 80, Polysorbate 85, Propylene Glycol Isostearate, Sorbitan Isostearate, Sorbitan Laurate, Sorbitan Monostearate, Sorbitan Oleate, Sorbitan Sesquioleate, Sorbitan Stearate, Sorbitan Trioleate, Stearamide MEA, Steareth-100, Steareth-2, Steareth-20, Steareth-21. The compositions can further include surfactants or combinations of surfactants that create liquid crystalline networks or liposomal networks. Suitable non-limiting examples include OLIVEM 1000 (INCI: Cetearyl Olivate (and) Sorbitan Olivate (available from HallStar Company (Chicago, IL)); ARLACEL LC (INCI: Sorbitan Stearate (and) Sorbityl Laurate, commercially available from Croda (Edison, NJ)); CRYSTALCAST MM (INCI: Beta Sitosterol (and) Sucrose Stearate (and) Sucrose Distearate (and) Cetyl Alcohol (and) Stearyl Alcohol, commercially available from MMP Inc. (South Plainfield, NJ)); UNIOX CRISTAL (INCI: Cetearyl Alcohol (and) Polysorbate 60 (and) Cetearyl Glucoside, commercially available from Chemyunion (Sao Paulo, Brazil)). Other suitable emulsifiers include lecithin, hydrogenated lecithin, lysolecithin, phosphatidylcholine, phospholipids, and combinations thereof.

Adjunct Ingredients

The anti-adherent compositions of the present disclosure may additionally include adjunct ingredients conventionally found in pharmaceutical compositions in an established fashion and at established levels. For example, the anti-adherent compositions may comprise additional compatible pharmaceutically active and compatible materials for combination therapy, such as antioxidants, anti-parasitic agents, antipruritics, antifungals, antiseptic actives, biological actives, astringents, keratolytic actives, local anaesthetics, anti-stinging agents, anti-reddening agents, skin soothing agents, external analgesics, film formers, skin exfoliating agents, sunscreens, and combinations thereof.

Other suitable additives that may be included in the anti-adherent compositions of the present disclosure include compatible colorants, deodorants, emulsifiers, anti-foaming agents (when foam is not desired), lubricants, skin conditioning agents, skin protectants and skin benefit agents (e.g., aloe vera and tocopheryl acetate), solvents, solubilizing agents, suspending agents, wetting agents, pH adjusting ingredients (a suitable pH range of the compositions can be from about 3.5 to about 8), chelators, propellants, dyes and/or pigments, and combinations thereof.

Another component that may be suitable for addition to the anti-adherent compositions is a fragrance. Any compatible fragrance may be used. Typically, the fragrance is present in an amount from about 0% (by weight of the composition) to about 5% (by weight of the composition), and more typically from about 0.01% (by weight of the composition) to about 3% (by weight of the composition). In one desirable embodiment, the fragrance will have a clean, fresh and/or neutral scent to create an appealing delivery vehicle for the end consumer.

Organic sunscreens that may be present in the anti-adherent compositions include ethylhexyl methoxycinnamate, avobenzone, octocrylene, benzophenone-4, phenylbenzimidazole sulfonic acid, homosalate, oxybenzone, benzophenone-3, ethylhexyl salicylate, and mixtures thereof.

As previously noted, in some embodiments, antimicrobial agents can be added to the anti-adherent compositions. For example, suitable antimicrobials include biocides such as a short-chain alcohol, benzoalkonium chloride ("BAC"), didecyl dimethyl ammonium chloride ("DDAC"), and zeolite ("CWT-A"). Other possible antimicrobial agents include: isothiazolone, alkyl dimethyl ammonium chloride, a triazine, 2-thiocyanomethylthio benzothiazol, methylene bis thiocyanate, acrolein, dodecylguanidine hydrochloride, a chlorophenol, a quaternary ammonium salt, gluteraldehyde, a dithiocarbamate, 2-mercatobenzothiazole, para-chloro-meta-xylenol, silver, chlorhexidine, polyhexamthylene biguanide, a n-halamine, triclosan, a phospholipid, an alpha hydroxyl acid, 2,2-dibromo-3-nitrilopropionamide, 2-bromo-2-nitro-1,3-propanediol, farnesol, iodine, bromine, hydrogen peroxide, chlorine dioxide, a botanical oil, a botanical extract, benzalkonium chloride, chlorine, sodium hypochlorite, or combinations thereof. In some embodiments, the antimicrobial agent can be antibacterial. In some embodiments, the antimicrobial agent can be antiviral. In some embodiments, the antimicrobial agent can be antibacterial and antiviral.

When present, the amount of the antimicrobial agent in the anti-adherent compositions can be in an amount between about 0.01% to about 5% (by total weight of the composition), or in some embodiments between about 0.05% to about 3% (by total weight of the composition).

Preservatives

The anti-adherent compositions may include various preservatives to increase shelf life. Some suitable preservatives that may be used in the present disclosure include, but are not limited to phenoxyethanol, capryl glycol, glyceryl caprylate, sorbic acid, gallic acid, KATHON CG®, which is a mixture of methylchloroisothiazolinone and methylisothiazolinone, (available from Rohm & Haas Company, Philadelphia, PA); DMDM hydantoin (e.g., GLYDANT, available from Lonza, Inc., Fair Lawn, NJ); EDTA and salts thereof; iodopropynyl butylcarbamate; benzoic esters (parabens), such as methylparaben, propylparaben, butylparaben, ethylparaben, isopropylparaben, isobutylparaben, benzylparaben, sodium methylparaben, and sodium propylparaben; 2-bromo-2-nitropropane-1,3-diol; benzoic acid; and the like. Other suitable preservatives include those sold by Sutton Labs Inc., Chatham, NJ, such as "GERMALL 115" (imidazolidinyl urea), "GERMALL II" (diazolidinyl urea), and "GERMALL PLUS" (diazolidinyl urea and iodopropynyl butylcarbonate).

The amount of the preservative in the anti-adherent compositions is dependent on the relative amounts of other components present within the composition. For example, in some embodiments, the preservative is present in the compositions in an amount between about 0.001% to about 5% (by total weight of the composition), in some embodiments between about 0.01 to about 3% (by total weight of the composition), and in some embodiments, between about 0.05% to about 1.0% (by total weight of the composition).

Preparation of Anti-adherent Compositions

The anti-adherent compositions of the present disclosure may be prepared by combining ingredients at room temperature and mixing.

In one embodiment, when the anti-adherent composition is to be applied to the skin of an individual, the composition includes the anti-adherent agent, a hydrophilic carrier and a hydrophilic thickener. Suitable hydrophilic carriers can be, for example, water, glycerin, glycerin derivatives, glycols, water-soluble emollients, and combinations thereof. Suitable examples of glycerin derivatives could include, but are not to be limited to, PEG-7 glyceryl cocoate. Suitable glycols could include, but are not to be limited to, propylene glycol, butylene glycol, pentylene glycol, ethoxydiglycol, dipropylene glycol, propanediol, and PEG-8. Suitable examples of water-soluble emollients could include, but are not to be limited to, PEG-6 Caprylic Capric Glycerides, Hydrolyzed Jojoba Esters, and PEG-10 Sunflower Glycerides.

Delivery Vehicles

The anti-adherent compositions of the present disclosure may be used in combination with a product. For example, the composition may be incorporated into or onto a substrate, such as a wipe substrate, an absorbent substrate, a fabric or cloth substrate, a tissue or paper towel substrate, or the like. In one embodiment, the anti-adherent composition may be used in combination with a wipe substrate to form a wet wipe or may be a wetting composition for use in combination with a wipe which may be dispersible. In other embodiments, the anti-adherent composition may be incorporated into wipes such as wet wipes, hand wipes, face wipes, cosmetic wipes, cloths and the like. In yet other embodiments, the anti-adherent compositions described herein can be used in combination with numerous personal care products, such as absorbent articles. Absorbent articles of interest are diapers, training pants, adult incontinence products, feminine hygiene products, and the like; bath or facial tissue; and paper towels. Personal protective equipment articles of interest include but are not limited to masks, gowns, gloves, caps, and the like.

In one embodiment, the wet wipe may comprise a nonwoven material that is wetted with an aqueous solution termed the "wetting composition," which may include or be composed entirely of the anti-adherent compositions disclosed herein. As used herein, the nonwoven material comprises a fibrous material or substrate, where the fibrous material or substrate comprises a sheet that has a structure of individual fibers or filaments randomly arranged in a mat-like fashion. Nonwoven materials may be made from a variety of processes including, but not limited to, airlaid processes, wet-laid processes such as with cellulosic-based tissues or towels, hydroentangling processes, staple fiber carding and bonding, melt blown, and solution spinning.

The fibers forming the fibrous material may be made from a variety of materials including natural fibers, synthetic fibers, and combinations thereof. The choice of fibers may depend upon, for example, the intended end use of the finished substrate and the fiber cost. For instance, suitable fibers may include, but are not limited to, natural fibers such as cotton, linen, jute, hemp, wool, wood pulp, etc. Similarly, suitable fibers may also include: regenerated cellulosic fibers, such as viscose rayon and cuprammonium rayon; modified cellulosic fibers, such as cellulose acetate; or synthetic fibers, such as those derived from polypropylenes, polyethylenes, polyolefins, polyesters, polyamides, polyacrylics, etc. Regenerated cellulose fibers, as briefly discussed above, include rayon in all its varieties as well as other fibers derived from viscose or chemically modified cellulose, including regenerated cellulose and solvent-spun cellulose, such as Lyocell. Among wood pulp fibers, any known papermaking fibers may be used, including softwood and hardwood fibers. Fibers, for example, may be chemically pulped or mechanically pulped, bleached or unbleached, virgin or recycled, high yield or low yield, and the like. Chemically treated natural cellulosic fibers may be used, such as mercerized pulps, chemically stiffened or crosslinked fibers, or sulfonated fibers.

In addition, cellulose produced by microbes and other cellulosic derivatives may be used. As used herein, the term "cellulosic" is meant to include any material having cellulose as a major constituent, and, specifically, comprising at least 50 percent by weight cellulose or a cellulose derivative. Thus, the term includes cotton, typical wood pulps, non-woody cellulosic fibers, cellulose acetate, cellulose triacetate, rayon, thermomechanical wood pulp, chemical wood pulp, debonded chemical wood pulp, milkweed, or bacterial cellulose. Blends of one or more of any of the previously described fibers may also be used, if so desired.

The fibrous material may be formed from a single layer or multiple layers. In the case of multiple layers, the layers are generally positioned in a juxtaposed or surface-to-surface relationship and all or a portion of the layers may be bound to adjacent layers. The fibrous material may also be formed from a plurality of separate fibrous materials wherein each of the separate fibrous materials may be formed from a different type of fiber.

Airlaid nonwoven fabrics are particularly well suited for use as wet wipes. The basis weights for airlaid nonwoven fabrics may range from about 20 to about 200 grams per square meter (gsm) with staple fibers having a denier of about 0.5 to about 10 and a length of about 6 to about 15 millimeters. Wet wipes may generally have a fiber density of about 0.025 g/cc to about 0.2 g/cc. Wet wipes may generally have a basis weight of about 20 gsm to about 150 gsm. More desirably the basis weight may be from about 30 to about 90 gsm. Even more desirably the basis weight may be from about 50 gsm to about 75 gsm.

Processes for producing airlaid non-woven basesheets are described in, for example, published U.S. Pat. App. No. 2006/0008621, herein incorporated by reference to the extent it is consistent herewith.

As a result of the present disclosure, it has been discovered that an anti-adherent composition including an anti-adherent agent can be employed to inhibit the adherence of DNA viruses to a surface. Thus, in one embodiment, the anti-adherent composition can be applied to a surface (e.g., countertop, wall, table, skin, etc.) to reduce the amount of DNA viruses that will adhere to that surface. By reducing the amount of DNA viruses that will adhere to that surface, the anti-adherent composition can be used to reduce the likelihood that individuals come into contact with the DNA viruses, and thereby reduce the spreading of the DNA viruses. This benefit could be provided whether the anti-adherent composition was provided in the form of a liquid, gel, or foam; or incorporated into a wash, or is provided on or in a delivery vehicle such as a fibrous substrate (e.g., a wipe).

As shown by the examples and testing described further below, and specifically in Table 1, the use of the anti-adherent agent of C12-16 Alkyl PEG-2 Hydroxypropyl Hydroxyethyl Ethylcellulose provided a reduction of the attachment of DNA viruses to a polystyrene surface by at least 0.20 Log of viruses, or at least 0.25 Log of viruses, or at least 0.29 Log of viruses, according to the High Throughput Test to Quantify the Attachment of Phage to a Surface, discussed below. As will be discussed further below, this result is surprising from the standpoint that the composition including the agent of C12-16 Alkyl PEG-2 Hydroxypropyl Hydroxyethyl Ethylcellulose when tested against Gram negative bacteria (*Escherichia coli*) provided an increase in adherence of the Gram negative bacteria to a polystyrene surface, as noted in Table 5, as well as an increase in adherence of RNA viruses to a polystyrene surface, as noted in Table 2. Additionally, this composition provided an unexpected result from the standpoint that various other compositions including agents that led to anti-adherent properties to DNA viruses exhibited anti-adherent properties against bacteria, and not adherent properties against bacteria as did C12-16 Alkyl PEG-2 Hydroxypropyl Hydroxyethyl Ethylcellulose.

This dichotomy of properties of inhibiting adherence of DNA viruses but increasing the adherence of Gram negative bacteria can provide a benefit in an embodiment where compositions including the agent of C12-16 Alkyl PEG-2 Hydroxypropyl Hydroxyethyl Ethylcellulose are applied to a surface and then at least some of agent is removed from the surface, for example with a substrate. For example, compositions including the agent of C12-16 Alkyl PEG-2 Hydroxypropyl Hydroxyethyl Ethylcellulose can be applied to the surface by spraying a liquid or foam composition and then wiped off with a fibrous substrate. Alternatively, compositions including the agent of C12-16 Alkyl PEG-2 Hydroxypropyl Hydroxyethyl Ethylcellulose could be incorporated into a wipe and the agent could be applied to the surface by contacting the surface with the wipe. In either format, at least some of the composition including the agent of C12-16 Alkyl PEG-2 Hydroxypropyl Hydroxyethyl Ethylcellulose can remain on the surface, in which the anti-adherent properties of C12-16 Alkyl PEG-2 Hydroxypropyl Hydroxyethyl Ethylcellulose can provide a reduction of adherence of DNA viruses to that surface. The agent of C12-16 Alkyl PEG-2 Hydroxypropyl Hydroxyethyl Ethylcellulose provides the additional benefit in these examples that can help to remove Gram negative bacteria (e.g., *Escherichia coli*). Thus, compositions including the agent of C12-16 Alkyl PEG-2 Hydroxypropyl Hydroxyethyl Ethylcellulose can help prevent DNA viruses from adhering and collecting on the surface, but at the same time help remove potentially harmful Gram negative bacteria from that same surface, which can then be disposed by the fibrous substrate. This is true whether the compositions including the agent of C12-16 Alkyl PEG-2 Hydroxypropyl Hydroxyethyl Ethylcellulose are applied to the surface as a liquid, gel, foam, etc. and then wiped off the surface with a fibrous substrate or whether the compositions including the agent of C12-16 Alkyl PEG-2 Hydroxypropyl Hydroxyethyl Ethylcellulose are incorporated into a substrate (e.g., a wetting composition in a wipe) and then applied to the surface.

The disclosure will be more fully understood upon consideration of the following non-limiting examples described in the following section on testing.

TESTING

Attachment Against DNA Viruses

The anti-adherent composition that inhibits the attachment of DNA viruses to a surface, including the anti-adherent agent of C12-16 Alkyl PEG-2 Hydroxypropyl Hydroxyethyl Ethylcellulose, was discovered through testing a variety of compounds as anti-adherent agents against DNA viruses via the High Throughput Test to Quantify the Attachment of Phage to a Surface. Table 1 below shows the variety of compounds that were tested as agents in a composition, as well as the results that related to the percent reduction in viruses, the Logarithmic Reduction compared to growth controls, the T-Test Value, and whether the Logarithmic Reduction was statistically significant (S for significant, NS for not significant). As will be discussed in further detail below, a positive logarithmic reduction in viruses equates to anti-adherent properties against DNA viruses (e.g., inhibits attachment), and a negative logarithmic reduction in viruses equates to adherent properties against DNA viruses (e.g., increases attachment).

As can be seen from Table 1, several of the compounds exhibited positive logarithmic reductions in testing against DNA viruses, and thus, can help to inhibit adherence of a DNA virus to a surface. However, almost all of the compounds exhibiting positive logarithmic reductions in testing against DNA viruses also exhibited positive logarithmic reductions in testing against bacteria (see results shown in Tables 3-6). Surprisingly, C12-16 Alkyl PEG-2 Hydroxypropyl Hydroxyethyl Ethylcellulose (Compound No. 6 in Table 1) was the only agent of those tested that inhibited adherence of a DNA virus to a surface, but also increased adherence to bacteria. In other words, all of the remaining agents that inhibited adherence to DNA viruses, also exhibited similar anti-adherent behavior towards either Gram negative bacteria, Gram positive bacteria, or both. Looking specifically at the agent of C12-16 Alkyl PEG-2 Hydroxypropyl Hydroxyethyl Ethylcellulose, the logarithmic reduction in DNA viruses was 0.29, but this agent provided a logarithmic reduction of −4.2 for Gram negative bacteria, thus it was inhibiting adherence to DNA viruses, but increasing adherence to Gram negative bacteria. This result of anti-adherent properties against DNA viruses for the composition including C12-16 Alkyl PEG-2 Hydroxypropyl Hydroxyethyl Ethylcellulose is further surprising from the standpoint that when a composition including C12-16 Alkyl PEG-2 Hydroxypropyl Hydroxyethyl Ethylcellulose was tested against RNA viruses (see Table 2), the compound increased adherence (logarithmic reduction of −0.18).

The DNA virus that the compositions were tested against for attachment behaviors was Phi X 174. Bacteriophage are commonly utilized as surrogates of mammalian viruses in both medical and virology applications. Phi X174 is commonly utilized as a viral surrogate because of its size, morphology, environmental stability, and non-human infectivity, and the ability for use in high throughput assays. Phi X174 has been previously been used to study barrier efficacy, making it an ideal surrogate to study attachment to a surface (See, Hamann and Nelson, *Am J Infect Control,* 1993, 21:289-96, O'Connell, et al, *Clin Microb Infect,* 2004, 10:322-6, ASTM F1671/F1671M-13, Standard Test Method for Resistance of Materials Used in Protective Clothing to Penetration by Blood-Borne Pathogens Using Phi X174 Bacteriophage Penetration as a Test System). Thus, it is well accepted by those of ordinary skill in the art that Phi X 174 serves as a surrogate for other DNA viruses, and the compositions including the adherent agents noted above would act in a substantially similar behavior to other DNA viruses as they did against Phi X 174.

TABLE 1

Compounds and corresponding Log Reduction of DNA virus using the High Throughput Test to Quantify the Attachment of Phage to a Surface

| # | Compound Type | Compound Name (Manufacturer) | Con. Wt. %* | INCI Name | Percent Reduction | Log R (PFU/mL) compared to growth controls | T-Test Value | Statistical Signif. e(p < 0.05) |
|---|---|---|---|---|---|---|---|---|
| 1 | Modified cellulose | Sigma HPMC (Sigma Aldrich) | 3 | Hydroxypropyl methylcellulose | 85.06% | 0.83 | 0 | S |
| 2 | Modified cellulose | Benecel A4c (Ashland Inc.) | 1 | Methylcellulose | 90.70% | 1.03 | 0 | S |
| 3 | Modified cellulose | Benecel E15 (Ashland Inc.) | 1 | Hydroxypropyl-cellulose | 91.22% | 1.06 | 0 | S |
| 4 | Modified cellulose | Natrosol LR (Ashland Inc.) | 1 | Hydroxyethyl-cellulose | 97.41% | 1.59 | 0 | S |
| 5 | Polysaccharide | Structure Cel 8000 (AkzoNobel) | 3 | Methyl Hydroxyethyl Cellulose (MHEC) | −162.21% | −0.42 | 0 | S |
| 6 | Polysaccharide | Structure Cel 500 (AkzoNobel) | 1.5 | $C_{12-16}$ Alkyl PEG-2 Hydroxypropyl Hydroxyethyl Ethylcellulose | 48.84% | 0.29 | 0 | S |
| 7 | Polymeric sulfonic acid, neutralized | Aristoflex Velvet (Clariant) | 0.4 | Polyacrylate Crosspolymer-11 | 50.37% | 0.3 | 0.01 | S |
| 8 | Hydrophobically modified acrylate | Aculyn 22 (Dow Chemicals) | 2 | Acrylates/Steareth-20 Methacrylate Copolymer | 94.14% | 1.23 | 0 | S |
| 9 | Synthetic polymer | Eastman AQ (Eastman Chemical Co.) | 5 | Polyester-5 | 98.72% | 1.89 | 0 | S |
| 10 | Synthetic polymer | Pluronic 62 (BASF Corporation) | 5 | Ethylene Oxide/Propylene Oxide Block Copolymer | 96.57% | 1.46 | 0 | S |
| 11 | Modified silicone | Arlasilk PLN (Croda, Inc.) | 5 | Linoleamidopropyl PG-Dimonium Chloride Phosphate Dimethicone | 84.51% | 0.81 | 0 | S |
| 12 | Hydrophobically modified acrylate | Aculyn 38 (Dow Chemicals) | 2 | Acrylates/Vinyl Neodecanoate Crosspolymer | 75.38% | 0.61 | 0 | S |
| 13 | anionic polymeric emulsifier | SESAFLASH (Seppic) | 5 | Glycerin+, Acrylates Copolymer, VP/Polycarbamyl | 89.07% | 0.96 | 0 | S |

TABLE 1-continued

Compounds and corresponding Log Reduction of DNA virus using the High Throughput Test to Quantify the Attachment of Phage to a Surface

| Compound # | Compound Type | Compound Name (Manufacturer) | Con. Wt. %* | INCI Name | Percent Reduction | Log R (PFU/mL) compared to growth controls | T-Test Value | Statistical Signif. e(p < 0.05) |
|---|---|---|---|---|---|---|---|---|
| 14 | Synthetic polymer | Pecogel GC-310 (Phoenix Chemicals) | 5 | Polyglycol Ester, Hydrolyzed Sesame Protein PG-Propyl Methylsilanediol[+] VP/Dimethylamino ethylmethacrylate/ Polycarbamyl Polyglycol Ester | −32.41% | −0.12 | 0.11 | NS |
| 15 | Silicone | DC 193 Fluid (Dow Chemicals) | 6 | PEG-12 Dimethicone | 97.90% | 1.68 | 0 | S |
| 16 | Synthetic polymer | Sepimax ZEN (Fairfield) | 0.4 | Polyacrylate Crosspolymer-6 | 70.51% | 0.53 | 0 | S |
| 17 | Synthetic polymer | Ultrez 10 (Lubrizol Corporation) | 0.4 | Carbomer | 74.08% | 0.59 | 0 | S |
| 18 | Silicone | Dow Corning 200 (100 cst) (Dow Corning) | 100 | Dimethicone | 78.79% | 0.67 | 0 | S |
| 19 | Polysaccharide | Protanal Ester BV 3750 | 4 | Propylene Glycol Alginate | 94.43% | 1.25 | 0 | S |
| 20 | Modified silicone | Polyderm PPI-SI-WS (Alzo) | 5 | Bis-PEG-15 Dimethicone/IPDI Copolymer | 97.64% | 1.63 | 0 | S |
| 21 | Silicone | KF889s | 5 | Amodimethicone | 97.97% | 1.69 | 0 | S |
| 22 | Modified silicone | Silsoft 875 (Momentive) | 5 | PEG-12 Dimethicone | 95.17% | 1.32 | 0 | S |
| 23 | Synthetic polymer | Flexithix (Ashland Inc.) | 5 | PVP | 92.85% | 1.15 | 0 | S |
| 24 | Hydrophilic film former | Polyolpre-polymer-15 (Barnet) | 15 | PEG-8/SMDI Copolymer | 99.43% | 2.24 | 0 | S |
| 25 | Synthetic polymer | Pemulen TR-2 (Lubrizol) | 0.2 | C10-30 Alkyl Acrylate Crosspolymer | 83.27% | 0.78 | 0 | S |

*Con. Wt. % = Concentration of Compound in 5% glycerin and QS water, by total weight of solution, percent (unless otherwise noted)
[+]Carriers for the agent Attachment Against RNA Viruses Testing was also conducted of various compositions against RNA viruses using the High Throughput Test to Quantify the Attachment of Phage to a Surface Test Method as described herein. As noted above, the composition including C12-16 Alkyl PEG-2 Hydroxypropyl Hydroxyethyl Ethylcellulose provided adherent properties to RNA viruses, as shown in Composition No. 6 in Table 2 below.

The RNA virus that the compositions were tested against for attachment behaviors was MS2. Bacteriophage are commonly utilized as surrogates of mammalian viruses in both medical and virology applications. MS2 phage is commonly utilized as a viral surrogate because of its size, morphology, environmental stability, non-human infectivity, and the ability for use in high throughput assays. Additionally, MS2 is commonly used as a surrogate to study the spread of human Norovirus (See, Tung-Thompson, et al, *PLoS One,* 2015, 10(8): e0134277, Dawson D J, et al, *J App Micro,* 2005, 98: 203-209, Jones, et al, *J Hosp Infect,* 1991, 17:279-85). The use of MS2 phage in hand sanitizer studies makes it an ideal surrogate to study the interaction of personal care products and viral attachment. It is believed that compositions including the adherent agents noted above would act in a substantially similar behavior to other RNA viruses as they did against MS2.

TABLE 2

Compounds and corresponding Log Reduction of RNA virus using the High Throughput Test to Quantify the Attachment of Phage to a Surface

| # | Compound Type | Compound Name (Manufacturer) | Con. Wt. %* | INCI Name | Percent Reduction | Log R (PFU/mL) compared to growth controls | T-Test Value | Statistical Signif. e(p < 0.05) |
|---|---|---|---|---|---|---|---|---|
| 1 | Modified cellulose | Sigma HPMC (Sigma Aldrich) | 3 | Hydroxypropyl methylcellulose | 26.35% | 0.13 | 0.32 | NS |
| 2 | Modified cellulose | Benecel A4c (Ashland Inc.) | 1 | Methylcellulose | −438.40% | −0.73 | 0.01 | S |

TABLE 2-continued

Compounds and corresponding Log Reduction of RNA virus using the High Throughput Test to Quantify the Attachment of Phage to a Surface

| # | Compound Type | Compound Name (Manufacturer) | Con. Wt. %* | INCI Name | Percent Reduction | Log R (PFU/mL) compared to growth controls | T-Test Value | Statistical Signif. e($p < 0.05$) |
|---|---|---|---|---|---|---|---|---|
| 3 | Modified cellulose | Benecel E15 (Ashland Inc.) | 1 | Hydroxypropyl-cellulose | 80.17% | 0.70 | 0.02 | S |
| 4 | Modified cellulose | Natrosol LR (Ashland Inc.) | 1 | Hydroxyethyl-cellulose | 80.20% | 0.70 | 0.01 | S |
| 5 | Polysaccharide | Structure Cel 8000 (AkzoNobel) | 3 | Methyl Hydroxyethyl Cellulose (MHEC) | −1391.29% | −1.17 | 0 | S |
| 6 | Polysaccharide | Structure Cel 500 (AkzoNobel) | 1.5 | $C_{12-16}$ Alkyl PEG-2 Hydroxypropyl Hydroxyethyl Ethylcellulose | −51.65% | −0.18 | 0.27 | NS |
| 7 | Polymeric sulfonic acid, neutralized | Aristoflex Velvet (Clariant) | 0.4 | Polyacrylate Crosspolymer-11 | 99.01% | 2.00 | 0 | S |
| 8 | Hydrophobically modified acrylate | Aculyn 22 (Dow Chemicals) | 2 | Acrylates/Steareth-20 Methacrylate Copolymer | 20.14% | 0.10 | 0.21 | NS |
| 9 | Synthetic polymer | Eastman AQ (Eastman Chemical Co.) | 5 | Polyester-5 | −133.58% | −0.37 | 0 | S |
| 10 | Synthetic polymer | Pluronic 62 (BASF Corporation) | 5 | Ethylene Oxide/Propylene Oxide Block Copolymer | 99.17% | 2.08 | 0 | S |
| 11 | Modified silicone | Arlasilk PLN (Croda, Inc.) | 5 | Linoleamidopropyl PG-Dimonium Chloride Phosphate Dimethicone | 95.08% | 1.31 | 0 | S |
| 12 | Hydrophobically modified acrylate | Aculyn 38 (Dow Chemicals) | 2 | Acrylates/Vinyl Neodecanoate Crosspolymer | −37.97% | −0.14 | 0.25 | NS |
| 13 | anionic polymeric emulsifier | SESAFLASH (Seppic) | 5 | Glycerin+, Acrylates Copolymer, VP/Polycarbamyl Polyglycol Ester, Hydrolyzed Sesame Protein PG-Propyl Methylsilanediol+ | 91.27% | 1.06 | 0 | S |
| 14 | Synthetic polymer | Pecogel GC-310 (Phoenix Chemicals) | 5 | VP/Dimethylamino ethylmethacrylate/ Polycarbamyl Polyglycol Ester | 82.37% | 0.75 | 0 | S |
| 15 | Silicone | DC 193 Fluid (Dow Chemicals) | 6 | PEG-12 Dimethicone | 95.99% | 1.40 | 0 | S |
| 16 | Synthetic polymer | Sepimax ZEN (Fairfield) | 0.4 | Polyacrylate Crosspolymer-6 | 78.58% | 0.67 | 0 | S |
| 17 | Synthetic polymer | Ultrez 10 (Lubrizol Corporation) | 0.4 | Carbomer | 79.17% | 0.68 | 0 | S |
| 18 | Silicone | Dow Corning 200 (100 cst) (Dow Corning) | 100 | Dimethicone | 96.88% | 1.51 | 0 | S |
| 19 | Polysaccharide | Protanal Ester BV 3750 | 4 | Propylene Glycol Alginate | 83.69% | 0.79 | 0 | S |
| 20 | Modified silicone | Polyderm PPI-SI-WS (Alzo) | 5 | Bis-PEG-15 Dimethicone/IPDI Copolymer | 93.24% | 1.17 | 0 | S |
| 21 | Silicone | KF889s | 5 | Amodimethicone | 47.62% | 0.28 | 0.06 | NS |
| 22 | Modified silicone | Silsoft 875 (Momentive) | 5 | PEG-12 Dimethicone | 27.70% | 0.14 | 0.26 | NS |
| 23 | Synthetic polymer | Flexithix (Ashland Inc.) | 5 | PVP | −167.22% | −0.43 | 0.04 | S |
| 24 | Hydrophilic film former | Polyolpre-polymer-15 (Barnet) | 15 | PEG-8/SMDI Copolymer | 50.29% | 0.30 | 0.08 | NS |

TABLE 2-continued

Compounds and corresponding Log Reduction of RNA virus using the High Throughput Test to Quantify the Attachment of Phage to a Surface

| Compound # | Compound Type | Compound Name (Manufacturer) | Con. Wt. %* | INCI Name | Percent Reduction | Log R (PFU/mL) compared to growth controls | T-Test Value | Statistical Signif. e($p < 0.05$) |
|---|---|---|---|---|---|---|---|---|
| 25 | Synthetic polymer | Pemulen TR-2 (Lubrizol) | 0.2 | C10-30 Alkyl Acrylate Crosspolymer | −8.93% | −0.04 | 0.43 | NS |

*Con. Wt. % = Concentration of Compound in 5% glycerin and QS water, by total weight of solution, percent (unless otherwise noted)
+Carriers for the agent Attachment Against Bacteria Of the agents tested against DNA and RNA viruses, almost all of the same agents were also tested in compositions against bacteria using either a High Throughput Attachment Test (results shown in Tables 3, 5, and 6) or a Viable Count Attachment Test (results shown in Table 4). The High Throughput Attachment Test and the Viable Count Attachment Test are discussed in further detail below. Unless noted to the contrary, the agents were tested against Gram-positive *Staphylococcus aureus*, and Gram-negative *Escherichia coli*. The pH of the compositions for this testing between 3 to 10 pH, or about 4 to about 8 pH.

TABLE 3

Compounds and corresponding Log Reduction of *E. coli* and *S. aureus* using the High Throughput Attachment Test Method.

| Compound | Con. Wt. %* | INCI Name | Average Log reduction *E. coli* ATCC** 11229 | Average Log reduction *S. aureus* ATCC** 6538 |
|---|---|---|---|---|
| ACULYN 22 | 2 | Acrylates/Steareth-20 Methacrylate Copolymer | 1.3 | 1.6 |
| ARISTOFLEX VELVET | 0.40 | Polyacrylate Crosspolymer-11 | 2.6 | 2.1 |
| HPMC | 3 | Hydroxypropyl methylcellulose | 2.6 | 2.5 |
| PECOGEL GC-310 | 5 | VP/Dimethylaminoethylmethacrylate/ Polycarbamyl Polyglycol Ester | 1.3 | 1.8 |
| POLYOL-PREPOLYMER 15 | 10 | PEG-8 SMDI Copolymer | 1.2 | 1.4 |
| SESAFLASH | 5 | Glycerin+, Acrylates Copolymer, VP/Polycarbamyl Polyglycol Ester, Hydrolyzed Sesame Protein PG-Propyl Methylsilanediol+ | 1.1 | 1.0 |
| Dow Corning 200 (100 cst) | 100 | Dimethicone | Not tested | 1.8 |

*Con. Wt. % = Concentration of Compound in 5% glycerin and QS water, by total weight of solution, percent (unless otherwise noted)
**"ATCC" is the acronym for the American Type Culture Collection, Manassas, VA
+Carriers for the agents

TABLE 4

Compounds and corresponding Log Reduction of *E. coli* and *S. aureus* using the Viable Count Attachment Test Method. Unless specified, the final pH of the agents was between 5 and 7.5.

| Compound | Con. Wt. %* | INCI | Average Log reduction *E. coli* ATCC** 11229 | Average Log reduction *S. aureus* ATCC** 6538 |
|---|---|---|---|---|
| ACULYN 38 | 1 | Acrylates/Vinyl Neodecanoate Crosspolymer | 0.74 | Not tested |
| ACULYN 38++ | 1 | Acrylates/Vinyl Neodecanoate Crosspolymer | 0.62 | 0.67 |
| BENECEL A4C | 1 | Methylcellulose | 1.39 | 1.08 |
| BENECEL E-15 | 1 | Hydroxypropyl Methylcellulose | 2.34 | 1.58 |
| NATROSOL 250 LR | 1 | Hydroxyethylcellulose | 1.00 | 1.13 |
| PROTANAL ESTER BV-3750 | 4 | Propylene Glycol Alginate | 0.76 | 0.70 |
| POLYDERM PPI-SI-WS | 5 | Bis-PEG-15 Dimethicone/IPDI Copolymer | 0.51 | 1.09 |
| EASTMAN AQ 38 | 5 | Polyester-5 | 0.90 | 0.71 |
| FLEXITHIX | 5 | PVP | 0.61 | 0.59 |
| PLURONIC L 62 | 5 | Ethylene Oxide/Propylene Oxide Block Copolymer | 1.86 | 1.72 |
| SILSOFT 875 | 5 | PEG-12 Dimethicone | 0.55 | 1.46 |
| SEPIMAX ZEN++ | 0.4 | Polyacrylate Crosspolymer-6 | 0.51 | 0.70 |
| ARLASILK PLN | 5 | Linoleamidopropyl PG-Dimonium Chloride Phosphate Dimethicone | 1.08 | 0.87 |

*Con. Wt. % = Concentration of Compound in 5% glycerin and QS water, by total weight of solution, percent (unless otherwise noted)
**"ATCC" is the acronym for the American Type Culture Collection, Manassas, VA
++Provided with 60% ethanol, 5% glycerin (by total weight of the composition), QS water Tables 5 and 6 provide additional attachment testing against bacteria. Table 5 provides the results of the attachment of Gram negative *Escherichia coli* to a polystyrene surface treated with various compositions including different compounds according to the High Throughput Attachment Test. Table 6 provides the results of the attachment of Gram positive *Staphylococcus aureus* to a polystyrene surface treated with various compositions including different compounds according to the High Throughput Attachment Test.

TABLE 5

Compounds and corresponding Log Reduction of *E. coli* using the High Throughput Attachment Test

| Compound Type | Compound Name | Con. Wt. %* | pH | INCI Name | Average Log reduction *E. coli* (ATCC** 11229) |
|---|---|---|---|---|---|
| Polysaccharide | Structure Cel 8000 M | 1.5 | | Methyl Hydroxyethyl Cellulose (MHEC) | −11.4 |
| Silicone | KF 889s | 5.0 | | Amodimethicone | −8.4 |
| Synthetic polymer | Ultrez 10 | 5.0 | 4.4 | Carbomer | −5.8 |
| Polysaccharide | Structure Cel 500 HM | 3.0 | | $C_{12-16}$ Alkyl PEG-2 Hydroxypropyl Hydroxyethyl Ethylcellulose | −4.2 |
| Synthetic Polymer | Pemulen TR-2 | 0.2 | 3.39 | $C_{10-30}$ Alkyl Acrylate Crosspolymer | −1.0 |
| Synthetic Polymer | Pemulen TR-2 | 0.2 | 6.30 | $C_{10-30}$ Alkyl Acrylate Crosspolymer | −0.9 |
| Synthetic Polymer | Pemulen TR-2 Neutralized | 0.2 | | $C_{10-30}$ Alkyl Acrylate Crosspolymer | −0.3 |
| Silicone | DC 193 | 5.0 | | PEG-12 Dimethicone | 0.6 |
| Polysaccharide | HPMC | 3.0 | | Hydroxy Propyl Methyl Cellulose | 2.5 |

*Con. Wt. % = Concentration of Compound in 5% glycerin and QS water, by total weight of solution, percent (unless otherwise noted)
**"ATCC" is the acronym for the American Type Culture Collection, Manassas, VA

TABLE 6

Compounds and corresponding Log Reduction of *Staphylococcus aureus* using the High Throughput Attachment Test

| Compound Type | Compound Name | Con. Wt. %* | pH | INCI Name | Average Log reduction *S. aureus* (ATCC** 6538) |
|---|---|---|---|---|---|
| Synthetic polymer | Ultrez 10 | 5.0 | 4.4 | Carbomer | −5.8 |
| Synthetic polymer | Pemulen TR-2 | 0.2 | 6.3 | $C_{10-30}$ Alkyl Acrylate Crosspolymer | −3.2 |
| Synthetic Polymer | Pemulen TR-2 | 0.2 | 7.3 | $C_{10-30}$ Alkyl Acrylate Crosspolymer | −0.9 |
| Synthetic Polymer | Pemulen TR-2 | 0.2 | 5.4 | $C_{10-30}$ Alkyl Acrylate Crosspolymer | −0.4 |
| Synthetic Polymer | Pemulen TR-2 Neutralized | 0.2 | | $C_{10-30}$ Alkyl Acrylate Crosspolymer | −0.1 |

*Con. Wt. % = Concentration of Compound in 5% glycerin and QS water, by total weight of solution, percent (unless otherwise noted)
**"ATCC" is the acronym for the American Type Culture Collection, Manassas, VA

TEST METHODS

High Throughput Test to Quantify the Attachment of Phage to a Surface 1.0 Test Methods:

Growth and purification of phage is outlined in the following steps.

1.1 Subculture: (these steps ensured that the organism are less than 5 generations removed from the original clinical isolate):
  1.1.1 Using a cryogenic stock (at −70° C.), a first sub-culture of the bacterial organisms listed above is streaked out on appropriate media.
  1.1.2 The plate is incubated at 36±2° C. for 24 hours and store the plate is wrapped in parafilm at 4° C.
  1.1.3 From the first sub-culture, a second sub-culture is streaked out on appropriate media. It is incubated at 36±2° C. for 24 hours. The second sub-culture is used within 24 hours starting from the time it is first removed from incubation.
  1.1.4 Organism(s) from the second sub-culture are inoculated into 30-200 mL OSB and incubated at 36±2° C. on a rotary shaker (at approximately 150 rpm) for 16-18 hours. This is to achieve an inoculum density of approximately $10^9$ CFU/ml.
1.2 Prepare Top Agar:
  1.2.1 Top Agar is prepared by preparing 200 mL of OSB according to manufacturer's directions and adding 0.7% agar. After sterilization, the sterilized mix is stored in a water bath set at 49° C.
  1.2.2 The top agar solution is aliquoted by moving 4 mL into sterile tubes. The tubes are kept at 49 C until needed for use.
1.3 Preparation of bacterial host:
  1.3.1 40 mL of broth culture is moved to a centrifuge tube.
  1.3.2 The overnight broth culture is centrifuged at 4000×g for 5 minutes.
  1.3.3 The supernatant is decanted and the cells were re-suspended in the same volume (40 mL for example) of BPB.
  1.3.4 Steps 4.2.2 to 4.2.3 are repeated one more time.
1.4 Propagation of the Phage:
  1.4.1 The OSA plates to be used are warmed to room temperature.
  1.4.2 The top agar tubes are inoculated with 200 µL of concentrated phage stock from either an ATCC or a previously stored concentrated stock. For frozen stock 500 µL of TSB warmed to 49° C. is added before adding to the Top Agar.
  1.4.3 100 µL of the washed broth culture is added and swirled gently to mix.
  1.4.4 Each inoculated top agar tube is poured onto one prepared OSA plate. The plate is tilted to ensure that the top agar was spread across the entire surface.
  1.4.5 The top agar is allowed to solidify, was inverted and placed in an incubator at 37° C. for overnight growth.
  1.4.6 Following overnight growth the plates should show complete clearing.
  1.4.7 The SM Buffer solution is warmed to 49° C.
  1.4.8 2 mL of warmed SM Buffer is added to each plate and the top agar is scraped using sterile white Teflon policeman. A pipette is used to transfer all the SM buffer and top agar to a sterile tube. This is done for every plate.
  1.4.9 The collected top agar tubes are vortexed for 10-15 seconds.
  1.4.10 The vortexed tubes are centrifuged at 1000×g for 25 minutes.
  1.4.11 From each centrifuged tube the supernatants are pooled in one new sterile tube.
  1.4.12 A sterile 0.20 filter is prepared by flushing 2-3 mL of 3% w/v cold (4 C) beef extract through the filter and discarded.
  1.4.13 The prepared filter is used to filter the pooled recovered top agar into a fresh sterile tube.
  1.4.14 The collected filtrate is the purified phage. Plaque Forming Units (PFU) are checked by serially diluting and spot plating using the method described in section 4.5.
1.5 Phage (MS2 and PhiX 174) Enumeration:
  1.5.1 Phage is prepared for use from the stock by diluting 1:1 in BPB.
  1.5.2 Spot Plate Method:
    1.5.2.1 A cell dilution of ~$10^6$ CFU/mL of *E. coli* (*E. coli* K12 is used for MS2 phage and *E. coli* C is used for PhiX 174) is prepared from the prepared washed broth culture by diluting in sterile BPB.
    1.5.2.2 An inoculum check is performed on the bacterial dilution in triplicate.
    1.5.2.3 In a 96 well plate, columns 1-12 are filled with 180 µL of the $10^6$ CFU/ml *E. coli* suspension in BPB
    1.5.2.4 20 µL of the samples to be diluted is added in column 1.
    1.5.2.5 10-fold (10× Dilution) in BPB is performed from $10^1$-$10^{12}$ by moving 20 µL from column 1 to column 2 and mixing. This is repeated, moving down the columns until column 12.
    1.5.2.6 20 µL (or 10 if agar permits) is spot plated on a large labelled OSA plate (spot plate every second column to avoid cross merging of spot plated phages.
    1.5.2.7 Plates are inverted & incubated for 24 h at 37° C.
    1.5.2.8 After 24 h the number of PFU is counted.

1.6 Preparation of the Challenge plates:

TABLE 7

The challenge will be tested using the specified contact time (Total of 6 challenge plates). SC wells are sterility controls for each experiment.

|   | 1 | 2 | 3 | 4 | 5 | 6 | 7 | 8 | 9 | 10 | 11 | 12 |
|---|---|---|---|---|---|---|---|---|---|----|----|----|
| A | A | B | C | D | E | F |   |   |   | SC-A | GC | GC |
| B | A | B | C | D | E | F |   |   |   | SC-B | GC | GC |
| C | A | B | C | D | E | F |   |   |   | SC-C | GC | GC |
| D | A | B | C | D | E | F |   |   |   | SC-D | GC | GC |
| E | A | B | C | D | E | F |   |   |   | SC-E | GC | GC |
| F | A | B | C | D | E | F |   |   |   | SC-F | GC | GC |
| G | A | B | C | D | E | F |   |   |   |    | GC | GC |
| H | A | B | C | D | E | F |   |   |   |    | GC | GC |

1.6.1 Preparation of compounds and coating compounds onto MBEC plate lid
1.6.2 Using a positive displacement pipette aseptically add 200 μL of compounds to be tested to a sterile 96-well microplate according to the plate layout described below.
1.6.3 Add 200 μL of each code to the appropriate well for sterility controls.
1.6.4 Place the MBEC plate lid, peg side down into the 96-well microplate containing the test compound solutions.
1.6.5 Allow the plate to sit at room temperature (25±3° C.) for 2 hrs.
1.6.6 Remove the MBEC plate lid and allow the lid to dry at room temperature (25±3° C.) overnight in a laminar flow hood by spacing the MBEC plate lid from the MBEC plate trough with two 10 μL disposable loops.

1.7 Phage attachment to MBEC Lids:
1.7.1 Using the phage prepared in 1:1 BPB from stock 100 μL is added to the wells indicated by the plate layout of the sterile 96 well plate.
1.7.2 The sterile MBEC lid is placed into the wells.
1.7.3 The plate is allowed to incubate for 1 hour at room temperature without shaking.
1.7.4 Rinse plates, 3 plates per MBEC lid, by adding 200 μL of PBS to wells indicated by the plate layout of a sterile 96 well plate.

1.8 Phage recovery:
1.8.1 Using flamed pliers the pegs are removed from the MBEC lid and placed in a tube containing 5 mL BPB.
1.8.2 Vortex for 1 minute.
1.8.3 Perform a serial dilution on the recovery solution.
1.8.4 Enumerate the PFU by using one of the methods indicated previously.

1.9 $LOG_{10}$ Reduction:
1.9.1 In a 96 well plate, columns 1-12 are filled with 180 μL of the 10E6 CFU/ml of the appropriate *E. coli* suspension in BPB
1.9.2 20 μL of the samples to be diluted is added in column 1.
1.9.3 10-fold (10× Dilution) in BPB is performed from 10E1-10e12 by moving 20 μL from column 1 to column 2 and mixing. This is repeated, moving down the columns until column 12.
1.9.4 20 μL (or 10 if agar permits) is spot plated on a large labelled OSA plate (spot plate every second column to avoid cross merging of spot plated phages.
1.9.5 Plates are inverted & incubated for 24 h at 37° C.
1.9.6 After 24 h the number of PFU is counted.
1.9.7 Cell Enumeration:
    1.9.7.1 Count the appropriate number of colonies according to the plating method used.
    1.9.7.2 Calculate the arithmetic mean of the colonies counted on the plates.
The log density for one peg is calculated as follows:

$LOG_{10}(PFU/peg)=LOG_{10}[(X/B)(D)]$ where:

X=mean PFU,
B=volume plated (0.02 mL)
and D=dilution.

Calculate the overall attached bacteria accumulation by calculating the mean of the log densities calculated.
Calculate the $LOG_{10}$ reduction for each dilution as follows:
LOG 10 Reduction=Mean $LOG_{10}$ Growth Control−Mean $LOG_{10}$ Test.
Calculate the Percent Reduction by calculating ($Log_{10}$(PFU/Peg) of the growth control pegs-$Log_{10}$(PFU/Peg) of the treated pegs)/$Log_{10}$(PFU/Peg) of the growth control pegs)×100

1.10 Accept or reject criteria
  1.10.1 Growth controls for the phage are between 4 and 6 Log 10
  1.10.2 Sterility controls do not show any growth.

High Throughput Attachment Test Method

This test method specifies the operational parameters required to grow and or prevent the formation of bacterial attachment using a high throughput screening assay. The assay device consists of a plastic lid with ninety-six (96) pegs and a corresponding receiver plate with ninety-six (96) individual wells that have a maximum 200 μL working volume. Biofilm is established on the pegs under static batch conditions (i.e., no flow of nutrients into or out of an individual well).

1. Terminology 1.2 Definitions of Terms Specific to This Standard:
  1.2.2 peg, n—biofilm sample surface (base: 5.0 mm, height: 13.1 mm).
  1.2.3 peg lid, n—an 86×128 mm plastic surface consisting of ninety-six (96) identical pegs.
  1.2.4 plate, n—an 86×128 mm standard plate consisting of ninety-six (96) identical wells.
  1.2.5 well, n—small reservoir with a 50 to 200 μL working volume capacity.

2. Acronyms 2.2 ATCC: American Type Culture Collection
2.3 CFU: colony forming unit
2.4 rpm: revolutions per minute
2.5 SC: sterility control
2.6 TSA: tryptic soy agar
2.7 TSB: tryptic soy broth
2.8 GC: growth control 3. Apparatus 3.2 Inoculating loop—nichrome wire or disposable plastic.
3.3 Petri dish—large labelled (100×150×15 mm, plastic, sterile) for plating.
3.4 Microcentrifuge tubes—sterile, any with a 1.5 mL volume capacity.

3.5 96-well microtiter plate—sterile, 86×128 mm standard plate consisting of ninety-six (96) identical flat bottom wells with a 200 μL working volume
3.6 Vortex—any vortex that will ensure proper agitation and mixing of microfuge tubes.
3.7 Pipette—continuously adjustable pipette with volume capability of 1 mL.
3.8 Micropipette—continuously adjustable pipette with working volume of 10 μL-200 μL.
3.9 Sterile pipette tips—200 uL and 1000 uL volumes.
3.10 Sterile reagent reservoir—50 mL polystyrene.
3.11 Sterilizer—any steam sterilizer capable of producing the conditions of sterilization.
3.12 Colony counter—any one of several types may be used. A hand tally for the recording of the bacterial count is recommended if manual counting is done.
3.13 Environmental incubator—capable of maintaining a temperature of 35±2° C. and relative humidity between 35 and 85%.
3.14 Reactor components—the MBEC Assay device available from Innovotech, Edmonton, AB, Canada.
3.15 Sterile conical tubes—50 mL, used to prepare initial inoculum.
3.16 Appropriate glassware—as required to make media and agar plates.
3.17 Erlenmeyer flask—used for growing broth inoculum.
3.18 Positive Displacement pipettes capable of pipetting 200 μL.
3.19 Sterile pipette tips appropriate for Positive Displacement pipettes.

4. Reagents and Materials 4.2 Purity of water—all references to water as diluent or reagent shall mean distilled water or water of equal purity.
4.3 Culture media:
4.4 Bacterial growth broth—Tryptic soy broth (TSB) prepared according to manufacturer's directions.
4.5 Bacterial plating medium—Tryptic soy agar (TSA) prepared according to manufacturer's directions.
4.6 Phosphate Buffered Saline (PBS)—
4.7 Rinse Solution: Sterile PBS and TWEEN 80 (Sigma-Aldrich, St. Louis, MO) 1% w/v.

5. Microorganisms 5.1 *E. coli* ATCC 11229 and *S. aureus* ATCC 6538

6. Test Method Overview: The Experimental Process for the High-Throughput Anti-Adherence Test Method. This Standard Protocol May be Broken into a Series of Small Steps, Each of which is Detailed in the Sections Below 6.1 Culture Preparation
6.1.1 *E. coli* ATCC 11229 and *S. aureus* ATCC 6538 are the organisms used in this test.
6.1.2 Using a cryogenic stock (at −70° C.), streak out a subculture of the above listed microorganisms on organism's specific agar (TSA).
6.1.3 Incubate at 35±2° C. for the period of time of 22±2 hours.
6.1.4 Aseptically remove isolated colony from streak plate and inoculate 20 mL of sterile TSB.
6.1.5 Incubate flask at 35±2° C. and 175±10 rpm for 16 to 18 hours (*E. coli* and *S. aureus*). Viable bacterial density should be $10^9$ CFU/mL and should be checked by serial dilution and plating.
6.1.6 Pipette 10 mL from the incubation flask of *E. coli* and *S. aureus* into a 50 mL conical tube and spin down at 5 minutes at 4,000×g. Then remove supernatant and Resuspend in 10 mL sterile PBS. Approximate cell density should be $10^7$-$10^9$ CFU/mL. Vortex the sample for approximately 30 seconds to achieve a homogeneous distribution of cells.
6.1.7 Perform 10-fold serial dilutions of the inoculum in triplicate.
6.1.8 Plate appropriate dilutions on appropriately labelled TSA plates. Incubate the plates at 35±2° C. for 22±2 hours depending on the isolates growth rate and enumerate.
6.2 Preparation of the Challenge plates:
6.2.1 Preparation of compounds and coating compounds onto MBEC plate lid
6.2.1.1.1 Using a positive displacement pipette aseptically add 200 μL of compounds and control to be tested to a sterile 96-well microplate according to the plate layout of Table 4.

TABLE 8

Sample layout of 96-well MBEC plate.

|  |  | 1 | 2 | 3 | 4 | 5 | 6 | 7 | 8 | 9 | 10 | 11 | 12 |
| --- | --- | --- | --- | --- | --- | --- | --- | --- | --- | --- | --- | --- | --- |
| *E. coli* | A | AC |  | T1 | T2 | T3 | T4 | T5 | T6 | T7 | T8 | NT-GC | T1-SC |
| *E. coli* | B | AC |  | T1 | T2 | T3 | T4 | T5 | T6 | T7 | T8 | NT-GC | T2-SC |
| *E. coli* | C | AC |  | T1 | T2 | T3 | T4 | T5 | T6 | T7 | T8 | NT-GC | T3-SC |
| *E. coli* | D | AC |  | T1 | T2 | T3 | T4 | T5 | T6 | T7 | T8 | NT-GC | T4-SC |
| *S. aureus* | E | AC |  | T1 | T2 | T3 | T4 | T5 | T6 | T7 | T8 | NT-GC | T5-SC |
| *S. aureus* | F | AC |  | T1 | T2 | T3 | T4 | T5 | T6 | T7 | T8 | NT-GC | T6-SC |
| *S. aureus* | G | AC |  | T1 | T2 | T3 | T4 | T5 | T6 | T7 | T8 | NT-GC | T7-SC |
| *S. aureus* | H | AC |  | T1 | T2 | T3 | T4 | T5 | T6 | T7 | T8 | NT-GC | T8-SC |

AC = Attachment Control
SC = Sterility Control
NT-GC = No Treatment Growth Control
T1-T8 = Test Codes 6.2.1.1.2 Add 200 µL of each code to the appropriate well for sterility controls.
6.2.1.1.3 Place the MBEC plate lid, peg side down into the 96-well microplate containing the test compound solutions.
6.2.1.1.4 Allow the plate to sit at room temperature (25±3° C.) for 2 hours.
6.2.1.1.5 Remove the MBEC plate lid and allow the lid to dry at room temperature (25±3° C.) overnight in a laminar flow hood.
7.1 Bacterial Adherence Challenge
7.1.1 Add 100 µL of diluted bacteria to the appropriate wells in a sterile 96-well microplate as indicated in the plate layout in Table 4.
7.1.2 Add 200 µL of sterile PBS to the sterility controls.
7.1.3 The MBEC containing dried compounds is then inserted into the bacterial inoculated 96 well flat bottom microplate from section 9.3.1 7.1.4 Incubate stationary at room temperature (25±3° C.) for 15 minutes.
7.1.5 Remove the MBEC lid and place into a 96-well microplate containing 200 µL PBS+1% w/v TWEEN 80. Incubate stationary at room temperature (25±3° C.) for 15 seconds.
7.1.6 Repeat step 7.1.5 for two additional washes for a total of 3 washes.
7.2 Method to Determine Number of Attached Bacteria
7.2.1 Transfer the washed MBEC plate lid to a 96-well plate containing 200 µL ALAMARBLUE reagent (prepared according to manufacturer's directions, Life Technologies, Carlsbad, CA) in each well to be tested.
7.2.2 The final plate is transferred to a SPECTRAMAX GEMINI EM microplate reader (Molecular Devices, Inc. Sunnyvale, CA USA) for a 20 hour kinetic, bottom read with an excitation of 560 nm and emission of 590 nm. The rate of fluorescence development (relative fluorescence units (RFU)/minute) is determined for each well.
7.2.3 Data was analyzed using a standard curve (described below) for each organism to determine the numbers of bacteria attached to the pegs (Log CFU/mL) present in each sample. Number of attached bacteria was quantified by incubating with an ALAMARBLUE reagent and measuring fluorescence development over time.
7.2.4 From these data, the Log CFU/mL reduction of each time point relative to the growth control is calculated to determine the activity of each code.
7.3 Method for Generating a Standard Curve with bacteria in an ALAMARBLUE Solution:
7.3.1 Standard curves were constructed for each organism to define the rate of fluorescence development as a function of bacterial concentration, as determined via viable plate counts. This standard curve provided the ability to relate rate of fluorescence development (RFU/minute) to the Log CFU/mL number of bacteria present in a given sample
7.3.2 Day 1:
7.3.2.1 Aseptically remove loopful of bacteria strain to be tested from freezer stock and place in 20 mL of TSB media in a culture flask.
7.3.2.2 Incubate with shaking (200 rpm) for 22±2 hours at 37±2° C.
7.3.3 Day 2:
7.3.3.1 Aseptically transfer 100 µL of the 22±2 hours freezer stock cultures into 20 mL of TSB media in a culture flask.
7.3.3.2 Incubate cultures on a gyrorotary shaker (200 rpm) for 22±2 hours at 37±2° C.
7.3.3.3 Perform a streak for isolation from the culture flask on TSA. Incubate plate for 22±2 hours at 37±2° C.
7.3.4 Day 3:
7.3.4.1 Prepare an ALAMARBLUE solution according to the manufacturer's directions.
7.3.4.2 Remove culture flask from shaking incubator after 22±2 hours. Pipette 1 mL of bacteria into a 1.7 mL microcentrifuge tube.
7.3.4.3 Centrifuge the bacteria at 4000×g.
7.3.4.4 Resuspend bacterial cells in sterile PBS. Perform a total of two washes.
7.3.4.5 Perform 1:10 serial dilutions with washed bacterial culture in 0.9 mL dilution blanks of sterile PBS (100 µL culture into 900 µL of sterile PBS).
7.3.4.6 Plate appropriate dilutions of prepared bacteria.
7.3.4.7 Add 270 µL of ALAMARBLUE solution to wells A-D: columns 1-7 of a 96-well plate.
7.3.4.8 Add 30 µL of bacterial dilution the wells of a 96-well plate (n=4 per dilution).
7.3.4.9 Add 30 µL of sterile PBS to wells A-D, column 8 for a background control.
7.3.4.10 Place plate in a bottom reading spectrophotometer that measures fluorescence. Set temp to 37° C. Perform assay at 37° C., read every 20 minutes for 24 hours at 560 excite and 590 emit.
7.3.4.11 Enumerate the dilutions.
7.3.4.12 Calculate the mean rate of fluorescence development.
7.3.4.13 Plot the mean rate of fluorescence development as a function of the mean CFU/mL of the dilutions.

Viable Count Attachment Test Method

This test method specifies the operational parameters required to grow and or prevent the formation of bacterial attachment using viable counts. The assay device consists of a plastic lid with ninety-six (96) pegs and a corresponding receiver plate with ninety-six (96) individual wells that have a maximum 200 µL working volume. Biofilm is established on the pegs under static batch conditions (i.e., no flow of nutrients into or out of an individual well).

This test method is identical to the High Throughput Attachment Test Method except that Section 7.1 through 7.3.4.13 is replaced with the following:

A. Bacterial Adherence Challenge:
  A.1 Add 100 µL of diluted bacteria to the appropriate wells in a sterile 96-well microplate as indicated in the plate layout in Table 4.
  A.2 Add 200 µL of sterile PBS to the sterility controls.
  A.3 The MBEC containing dried compounds is then inserted into the bacterial inoculated 96 well flat bottom microplate from section 9.3.1
B. Recovery:
  B.1 After the 15 minute contact time, transfer the MBEC™ lid to the rinse plate where each well contains 200 µL for 15 seconds of saline and 1% Tween 80 to wash of any loosely attached planktonic cells. Repeat this for 3 separate wash plates.
  B.2 *S. aureus* Recovery:
    B.2.1 Break the corresponding pegs from the MBEC™ lid using a sterile pliers and transfer them into 50 mL conical tubes containing 10 mL PBS.
    B.2.2 Vortex the conical tubes for 10 seconds
    B.2.3 Transfer the conical tubes to the sonicator and sonicate on high. Sonicate for 1 minute on. Then allow the tubes to rest for 1 minute. Repeat the sonication step for a total of 5 minutes of sonication to dislodge surviving attached bacteria. The conical tubes were placed in the sonicator water bath using a float.

B.2.4 Vortex the conical tubes again for 10 seconds.

8.3 *E. coli* Recovery:

B.3.1 Transfer the MBEC™ lid to a plate containing 200 μL PBS.

B.3.2 Transfer the plate to the sonicator and sonicate on high for 10 minutes to dislodge surviving attached bacteria. The plates are placed in a dry stainless steel insert tray which sits in the water of the sonicator. The vibrations created in the water by the sonicator transfer through the insert tray to actively sonicate the contents of the 96 well recovery plate(s).

C. $LOG_{10}$ Reduction:

C.1 Following sonication, place 100 μL from each well of the MBEC™ plate, into the first 12 empty wells of the first row of a 96 well-micro titer plate. Place 180 μL of sterile 0.9% saline in the remaining rows.

C.2 Prepare a serial dilution ($10^0$-$10^{-7}$) by moving 20 μL down each of the 8 rows.

C.3 Remove 10 μL from each well and spot plate on a prepared TSA plates.

C.4 Plates are incubated at 37±1° C. and counted after approximately 24 h hours of incubation.

C.5 Data will be evaluated as Log 10 CFU/peg.

C.6 Cell Enumeration:

C.7 Count the appropriate number of colonies according to the plating method used.

C.8 Calculate the arithmetic mean of the colonies counted on the plates.

C.8.1 The log density for one peg is calculated as follows:

$Log_{10}(CFU/peg)=Log_{10}[(X/B)(D)]$ where:

X=mean CFU; B=volume plated (0.02 mL); and D=dilution.

C.9 Calculate the overall attached bacteria accumulation by calculating the mean of the log densities calculated.

C.10 Calculate the $Log_{10}$ reduction for each dilution as follows: LOG 10 Reduction=Mean $LOG_{10}$ Growth Control−Mean $Log_{10}$ Test.

Explanation of Log Decrease

The compositions of the present disclosure exhibit a decrease of DNA viruses on surfaces. Log decrease, for example, may be determined from the decrease of DNA viruses adhered to a surface according to the following correlations:

| Fold Decrease of Viruses | LOG Decrease |
|---|---|
| 1 | 0.5 |
| 10 | 1 |
| 100 | 2 |
| 1000 | 3 |

In other words, surface exhibiting a decrease of viruses of 1 Log means the number of viruses on the fibrous substrate has decreased 10-fold, a decrease of 2 Log means the number of viruses has decreased 100-fold, a decrease of 3 Log means the number of viruses has decreased 1000-fold, etc., as compared to the number of bacteria present on a surface that is not treated with the disclosed composition. A larger Log decrease thus corresponds with a composition that is able to more effectively repel viruses.

EMBODIMENTS

Embodiment 1: A composition for inhibiting the attachment of DNA viruses to a surface, the composition comprising: a liquid carrier; an anti-adherent agent comprising C12-16 Alkyl PEG-2 Hydroxypropyl Hydroxyethyl Ethylcellulose; and a humectant.

Embodiment 2: The composition of embodiment 1, wherein the humectant is selected from the group consisting of: glycerin, glycerin derivatives, hyaluronic acid derivatives, betaine derivatives amino acids, amino acid derivatives, glycosaminoglycans, glycols, polyols, sugars, sugar alcohols, hydrogenated starch hydrolysates, hydroxy acids, hydroxy acid derivatives, salts of PCA, and any combination thereof.

Embodiment 3: The composition of embodiment 1, wherein the humectant is selected from the group consisting of: honey, sorbitol, hyaluronic acid, sodium hyaluronate, betaine, lactic acid, citric acid, sodium citrate, glycolic acid, sodium glycolate, sodium lactate, urea, propylene glycol, butylene glycol, pentylene glycol, ethoxydiglycol, methyl gluceth-10, methyl gluceth-20, PEG-2, PEG-3, PEG-4, PEG-5, PEG-6, PEG-7, PEG-8, PEG-9, PEG-10, xylitol, maltitol, and any combination thereof.

Embodiment 4: The composition of embodiment 1, wherein the humectant is selected from the group consisting of: glycerin, a glycerin derivative, and combinations thereof.

Embodiment 5: The composition of any one of the preceding embodiments, further comprising an ingredient selected from the group consisting of an emollient, a surfactant, an antimicrobial agent, and any combination thereof.

Embodiment 6: The composition of any one of the preceding embodiments, wherein the anti-adherent agent reduces the attachment of DNA viruses to a polystyrene surface by at least 0.25 Log of viruses according to the High Throughput Test to Quantify the Attachment of Phage to a Surface as described herein.

Embodiment 7: The composition of any one of the preceding embodiments, wherein the anti-adherent agent reduces the attachment of DNA viruses to a polystyrene Surface by at least 0.29 log of bacteria according to the High Throughput Test to Quantify the Attachment of Phage to a Surface as described herein.

Embodiment 8: The composition of any one of the preceding embodiments, wherein the liquid carrier is hydrophilic.

Embodiment 9: The composition of any one of the preceding embodiments, wherein the anti-adherent agent is present in the amount of about 0.01% to about 20.0% by weight of the composition, and wherein the humectant is present in the amount of about 0.01% to about 20.0% by weight of the composition.

Embodiment 10: A method for inhibiting the adherence of DNA viruses to a surface, the method comprising: providing a composition, the composition comprising: an anti-adherent agent comprising C12-16 Alkyl PEG-2 Hydroxypropyl Hydroxyethyl Ethylcellulose; and applying the composition to the surface to inhibit the adherence of DNA viruses to the surface.

Embodiment 11: The method of embodiment 10, wherein the composition further comprises a liquid carrier and a humectant.

Embodiment 12: The method of embodiment 11, wherein the humectant is selected from the group consisting of: glycerin, glycerin derivatives, hyaluronic acid derivatives, betaine derivatives amino acids, amino acid derivatives, glycosaminoglycans, glycols, polyols, sugars, sugar alcohols, hydrogenated starch hydrolysates, hydroxy acids, hydroxy acid derivatives, salts of PCA, and any combination thereof.

Embodiment 13: The method of embodiment 11, wherein the humectant is selected from the group consisting of: honey, sorbitol, hyaluronic acid, sodium hyaluronate, betaine, lactic acid, citric acid, sodium citrate, glycolic acid, sodium glycolate, sodium lactate, urea, propylene glycol, butylene glycol, pentylene glycol, ethoxydiglycol, methyl gluceth-10, methyl gluceth-20, PEG-2, PEG-3, PEG-4, PEG-5, PEG-6, PEG-7, PEG-8, PEG-9, PEG-10, xylitol, maltitol, and any combination thereof.

Embodiment 14: The method of embodiment 11, wherein the humectant is selected from the group consisting of: glycerin, a glycerin derivative, and combinations thereof.

Embodiment 15: The method of any one of embodiments 10-14, further comprising an ingredient selected from the group consisting of an emollient, a surfactant, an antimicrobial agent, and any combination thereof.

Embodiment 16: The method of any one of embodiments 10-15, further comprising: removing at least some of the composition from the surface while allowing at least some of the composition to remain on the surface.

Embodiment 17: A wipe for inhibiting the attachment of DNA viruses to a surface, the wipe comprising: a nonwoven substrate; and a composition comprising: a liquid carrier; and an anti-adherent agent comprising C12-16 Alkyl PEG-2 Hydroxypropyl Hydroxyethyl Ethylcellulose.

Embodiment 18: The wipe of embodiment 17, wherein the composition further comprises a humectant.

Embodiment 19: The wipe of embodiment 18, wherein the humectant is selected from the group consisting of: glycerin, glycerin derivatives, hyaluronic acid derivatives, betaine derivatives amino acids, amino acid derivatives, glycosaminoglycans, glycols, polyols, sugars, sugar alcohols, hydrogenated starch hydrolysates, hydroxy acids, hydroxy acid derivatives, salts of PCA, and any combination thereof.

Embodiment 20: The wipe of embodiment 18, wherein the humectant is selected from the group consisting of: glycerin, a glycerin derivative, and combinations thereof.

When introducing elements of the present disclosure, the articles "a", "an", "the" and "said" are intended to mean that there are one or more of the elements. The terms "comprising", "including" and "having" are intended to be inclusive and mean that there may be additional elements other than the listed elements. Many modifications and variations of the present disclosure can be made without departing from the spirit and scope thereof. Therefore, the exemplary embodiments described above should not be used to limit the scope of the disclosure.

What is claimed is:

1. A method for inhibiting the adherence of deoxyribonucleic acid (DNA) viruses to an abiotic surface, the method comprising:
    providing a composition, the composition comprising:
        an anti-adherent agent comprising C12-16 Alkyl Polyethylene Glycol (PEG)-2 Hydroxypropyl Hydroxyethyl Ethylcellulose;
        wherein the composition does not include any antimicrobial agent; and
    applying the composition to the abiotic surface to inhibit the adherence of DNA viruses to the abiotic surface.

2. The method of claim 1, wherein the composition further comprises a liquid carrier and a humectant.

3. The method of claim 1, further comprising:
    removing at least some of the composition from the abiotic surface while allowing at least some of the composition to remain on the abiotic surface.

* * * * *